United States Patent
Kwon et al.

(10) Patent No.: US 9,754,520 B2
(45) Date of Patent: Sep. 5, 2017

(54) FLEXIBLE DISPLAY APPARATUS AND CONTROLLING METHOD THEREOF

(71) Applicant: Samsung Electronics Co. Ltd., Suwon-si, Gyeonggi-do (KR)

(72) Inventors: Giang-yoon Kwon, Seoul (KR); So-young Park, Seoul (KR); Seung-woo Shin, Yongin-si (KR); Tae-won Eom, Seoul (KR); Chang-soo Lee, Seosan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 13/974,857

(22) Filed: Aug. 23, 2013

(65) Prior Publication Data
US 2014/0055429 A1 Feb. 27, 2014

(30) Foreign Application Priority Data
Aug. 23, 2012 (KR) ........................ 10-2012-0092629

(51) Int. Cl.
- G09G 3/00 (2006.01)
- G06F 3/01 (2006.01)
- G06F 1/16 (2006.01)
- G06F 3/0488 (2013.01)

(52) U.S. Cl.
CPC ........... *G09G 3/001* (2013.01); *G06F 1/1641* (2013.01); *G06F 1/1643* (2013.01); *G06F 1/1652* (2013.01); *G06F 1/1677* (2013.01); *G06F 3/013* (2013.01); *G06F 3/04883* (2013.01); *G06F 2203/04803* (2013.01); *G09G 2380/02* (2013.01)

(58) Field of Classification Search
CPC ........ G06F 1/1652; G06F 2203/04102; G09G 2380/02; H04M 1/0268
USPC ........................................ 345/156, 173, 1.3
See application file for complete search history.

(56) References Cited

U.S. PATENT DOCUMENTS

| | | | |
|---|---|---|---|
| 8,095,888 B2 | 1/2012 | Jang et al. | |
| 8,581,859 B2 | 11/2013 | Okumura et al. | |
| 8,803,816 B2 | 8/2014 | Kilpatrick, II et al. | |
| 8,966,393 B2 | 2/2015 | Jang et al. | |
| 9,052,769 B2 | 6/2015 | Choi et al. | |
| 2007/0279484 A1* | 12/2007 | Derocher | H04N 7/15 348/14.09 |
| 2008/0307324 A1* | 12/2008 | Westen | G06F 3/0486 715/753 |
| 2010/0031169 A1 | 2/2010 | Jang et al. | |
| 2010/0056223 A1* | 3/2010 | Choi et al. | 455/566 |
| 2010/0060548 A1* | 3/2010 | Choi et al. | 345/1.3 |

(Continued)

FOREIGN PATENT DOCUMENTS

| | | |
|---|---|---|
| CN | 101640725 A | 2/2010 |
| CN | 101674361 A | 3/2010 |

(Continued)

*Primary Examiner* — Koosha Sharifi-Tafreshi

(74) *Attorney, Agent, or Firm* — Jefferson IP Law, LLP

(57) ABSTRACT

A flexible display apparatus is provided. The flexible display apparatus includes a display unit, a sensor configured to sense a bending of the flexible display apparatus, and a controller configured to display first contents on a first screen of the display unit, and to reconfigure and display the first contents on a second screen generated on an area of the display unit based on the bending.

12 Claims, 33 Drawing Sheets

(56) References Cited

U.S. PATENT DOCUMENTS

| | | | |
|---|---|---|---|
| 2010/0064244 | A1 | 3/2010 | Kilpatrick, II et al. |
| 2010/0117975 | A1 | 5/2010 | Cho |
| 2010/0164888 | A1 | 7/2010 | Okumura et al. |
| 2010/0302179 | A1 | 12/2010 | Ahn et al. |
| 2011/0109567 | A1 | 5/2011 | Kim |
| 2012/0075347 | A1 | 3/2012 | Jang et al. |
| 2012/0092363 | A1 | 4/2012 | Kim et al. |
| 2012/0235894 | A1* | 9/2012 | Phillips .................. 345/156 |
| 2013/0321264 | A1* | 12/2013 | Park .................. G06F 3/01 345/156 |

FOREIGN PATENT DOCUMENTS

| | | |
|---|---|---|
| CN | 101782804 A | 7/2010 |
| CN | 102150095 A | 8/2011 |
| EP | 2166443 A2 | 3/2010 |

\* cited by examiner

FLEXIBLE DISPLAY APPARATUS AND CONTROLLING METHOD THEREOF

CROSS-REFERENCE TO RELATED APPLICATION(S)

This application claims the benefit under 35 U.S.C. §119(a) of a Korean patent application filed on Aug. 23, 2012 in the Korean Intellectual Property Office and assigned Serial No. 10-2012-0092629, the entire disclosure of which is hereby incorporated by reference.

TECHNICAL FIELD

The present disclosure relates to a flexible display apparatus and a controlling method thereof. More particularly, the present disclosure relates to a flexible display apparatus capable of being bent and a controlling method thereof.

BACKGROUND

With continuing improvements of electronic technologies, various types of display apparatuses are being developed and are widely used. For example, display apparatuses such as TVs, PCs, laptop computers, tablet PCs, mobile phones, MP3 players, etc. have such high penetration rates that they seem to be in use in almost all households.

Recently, in order to satisfy the needs of users who want newer and more various services, efforts are being made to develop new types of display apparatuses. So called next generation displays are such display apparatuses.

An example of a next generation display apparatus is a flexible display apparatus. A flexible display apparatus refers to a display apparatus that is able to change its shape in a manner similar to the way paper is able to change its shape.

The shape of such a flexible display apparatus may be changed by a user by applying force, and thus may be used for various purposes. For example, a flexible display apparatus may be embodied in a mobile apparatus such as a mobile phone, a tablet PC, an electronic frame, a PDA, an MP3 player, etc.

Unlike conventional display apparatuses, a flexible display apparatus has a characteristic that it is flexible. Accordingly, there needs to be ways to use that characteristic in operating a display apparatus.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a flexible display apparatus configured to optimize a screen according to a change of shape according to a bending input and a method of controlling the same.

In accordance with an aspect of the present disclosure, a flexible display apparatus is provided. The flexible display apparatus includes a display unit, a sensor configured to sense a bending of the flexible display apparatus, and a controller configured to display first contents on a first screen of the display unit, and to reconfigure and display the first contents on a second screen generated on an area of the display unit based on the bending.

Herein, the first screen may be the entire screen of the display unit.

In addition, the controller may control to reconfigure and display the first contents on the second screen generated on an area of the display unit at a first state of shape where the bending is maintained for a certain period of time.

In addition, the second screen may be generated in different shapes according to a location where the bending occurred, and the controller may reconfigure the contents in different shapes according to the shape of the second screen.

In addition, the controller may control to display information related to the first contents on a third screen generated on another area of the display unit based on the bending.

Furthermore, the flexible display apparatus may further comprise an eyeline detector configured to detect a direction of a user's eyeline, and the controller may control to change a display perspective according to a bending angle according to the detected direction of the user's eyeline and the bending, and to change at least one of the first contents and the information related to the first contents to correspond to the display perspective and display the same on the second screen and the third screen.

In addition, the information related to the first contents may be at least one of a first contents list comprising second contents of a same level as the first contents, a second contents list comprising a superior category of the first contents, and information for executing functions related to the first contents In addition, the controller may control to select the second contents belonging to the contents list, and to display the second contents on the entire screen of the display unit, when the bending is released.

Furthermore, the controller may control to display the first contents on the second screen, and to display the second contents on the second screen, when a flick manipulation is input with the second contents displayed on the third screen.

In accordance with another aspect of the present disclosure, the flexible display apparatus may further include a communicator configured to perform communication with a server, and the controller may control to transmit information on the second screen generated based on the bending to the server, and to receive and display the reconfigured first contents corresponding to the second screen from the server.

In addition, the flexible display apparatus may further include a communicator configured to perform a video call with a counterpart terminal, and the controller may control to display a video call image on the second screen, and to display an object for sharing contents with the counterpart terminal of the video call on a third screen generated on the other area of the display unit.

In accordance with another aspect of the present disclosure, a method for controlling a flexible display apparatus is provided. The method includes displaying first contents on a first screen of a display unit, sensing a bending of the flexible display apparatus, and reconfiguring and displaying the first contents on a second screen generated on an area of the display unit based on the bending.

Herein, the first screen may be the entire screen of the display unit.

In addition, the reconfiguring and displaying of the first contents may include reconfiguring and displaying the first contents on the second screen generated on an area of the display unit at a first state of shape where the bending is maintained for a certain period of time.

Furthermore, the second screen may be generated in different shapes according to a location where the bending occurred, and the reconfiguring and displaying of the first contents may include reconfiguring the contents in different shapes according to a shape of the second screen.

The method for controlling a flexible display apparatus may further comprise displaying information related to the first contents on a third screen generated on another area of the display unit based on the bending.

In addition, the method for controlling a flexible display apparatus may further include detecting a direction of a user's eyeline, and changing a display perspective according to a bending angle according to the detected direction of the user's eyeline and the bending, changing at least one of the first contents and the information related to the first contents to correspond to the display perspective and displaying the same on the second screen and the third screen.

Herein, the information related to the first contents may be at least one of a first contents list comprising second contents of a same level as the first contents, a second contents list comprising a superior category of the first contents, and information for executing functions related to the first contents.

Herein, the method for controlling a flexible display apparatus may further include selecting the second contents belonging to the contents list, and displaying the second contents on the entirety of the display unit, when the bending is released.

In addition, the method for controlling a flexible display apparatus may further include displaying the second contents on the second screen, and displaying the second contents on the second screen, when a flick manipulation is input with the second contents displayed on the third screen.

The method for controlling a flexible display apparatus may further include transmitting information on the second screen generated based on the bending to the server, and the reconfiguring and displaying of the first screen may include receiving the reconfigured first contents corresponding to the second screen from the server and displaying the same.

In addition, the method for controlling a flexible display apparatus may further include performing video call with a counterpart terminal, and displaying a video call image on the second screen, and displaying an object for sharing contents with the counterpart of the video call on a third screen generated on the other area of the display unit.

According to the aforementioned various embodiments of the present disclosure, it is possible to provide a screen optimized to various bending states, thereby improving user convenience.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
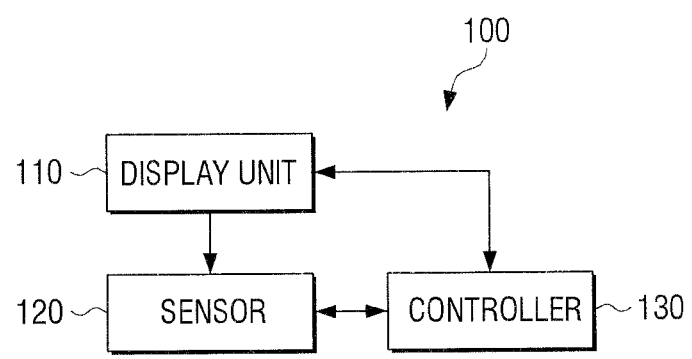
FIG. 1 is a block diagram illustrating a configuration of a flexible display apparatus in accordance with an embodiment of the present disclosure.

FIG. 1 is a block diagram illustrating a configuration of a flexible display apparatus in accordance with an embodiment of the present disclosure.

Referring to FIG. 1, the flexible display apparatus 100 includes a display unit 110, a sensor 120, and a controller 130.

The display unit 110 displays a screen. The flexible display apparatus 100 having the display unit 110 is capable of being bent. Accordingly, the display unit 110 must be made of materials and have a structure that are capable of being bent. Configuration of the display unit 110 will be explained below in more detail.

The sensor 120 senses a bending of the flexible display apparatus 100. More specifically, the sensor 120 uses a bend sensor, a pressure sensor, a strain gauge, etc. to recognize a location of bending/folding location, a direction of bending/folding, an angle of bending/folding, an intensity of bending/folding, a speed of bending/folding, a number of times of bending/folding, a time point of bending/folding, a duration time of bending/folding, etc.

More specifically, the sensor 120 may measure a bending radius value R of a bending location based on the distribution of resistance values output from the bend sensor or strain gauge or changes of distribution of pressure sensed in the pressure sensor and recognize an intensity of bending.

In addition, the sensor 120 may recognize a speed of bending based on a location of bending and a state of change of bending sensed through changes in the distribution of pressure sensed in the pressure sensor.

Furthermore, the sensor 120 may sense a change in the state of bending. More specifically, the sensor 120 may recognize a change of location of bending/folding, a change of direction of bending/folding, a change of angle of bending/folding, a change of intensity of bending/folding, etc.

In addition, the sensor 120 may recognize a bending line formed by a bending and a state of change of a bending line. More specifically, the sensor 120 may recognize a bending line through a change of distribution of pressure sensed in the pressure sensor. Herein, the bending line may be a virtual line made by connecting points which have been bent the most on an area where the bending occurred. For example, a bending line may be a virtual line made by connecting bending points (or bending coordinates) having the greatest resistance values output from the bend sensor.

The controller 130 may control to display first contents on a first screen of the display unit 110, and to reconfigure and display the first contents sensed in the sensor 120 on a second screen generated on an area of the display unit 110 based on the bending.

More specifically, the controller 130 may control to display the first contents on a first screen of the display unit 110. In one case, the first contents may be displayed on the entirety of the screen, at a first state of shape where a bending is not sensed. When a bending is sensed for more than a certain period of time such that the flexible display apparatus 100 has a second shape, the first contents may be reconfigured and displayed on a generated second screen of the display unit 110 based on the bending. Herein, the second screen may be generated in different shapes according to a location where the bending occurred, and the controller 130 may reconfigure the contents in different shapes according to the shape of the second screen and display the same on the second screen.

Furthermore, the controller 130 may control to display information related to the first contents on a third screen generated on another area of the display unit 110 based on the bending. That is, the controller 130 may reconfigure and display the first contents on the second screen generated on one area based on the bending, and display information related to the first contents on the third screen generated on the remaining area other than the area where the second screen is generated. Herein, information related to the first contents may be at least one of a first contents list including the second contents of the same level as the first contents, a second contents list including a superior category of the first contents, and information for executing functions related to the first contents.

In addition, the controller 130 may make the first contents disappear from the second screen and display the second contents on the second screen, when the first contents are displayed on the second screen generated based on the bending and there is a flick manipulation with the second contents displayed on the third screen. That is, a user may perform switching of the contents displayed on the screen through a flick manipulation. For example, with application contents listed and displayed on the second screen and on the third screen adjacent to the second screen, the user may touch the first application contents and perform a flick manipulation to switch the first application contents displayed on the second screen to the second application contents displayed on the third screen and display the same, and a new third application contents may be displayed on the third screen.

Meanwhile, the reconfigured contents screen may be prestored, generated in real time, or received from an external source according to the size of the second screen.

More specifically, the controller 130 may reconfigure the first contents to correspond to the second screen information generated based on the bending. Herein, the second screen information may be size information on the second screen.

For example, the controller 130 may perform scaling on the size of the first contents displayed on the entire screen to be suitable to the divided second screen size. In this case, the controller 130 may adjust the resolution of the first contents image, or process the contents image by adjusting only the size to be suitable to the second screen while keeping the ratio unchanged and display the result.

In addition, the controller 130 may reconfigure Hyper Text Markup Language (HTML) text, or perform video/image resizing in order to reconfigure the contents, and also reconfigure a User Interface (UI) to be suitable to the second screen. For example, the controller 130 may reconfigure the HTML Text where a browser is received to be suitable to the second screen size, or may perform resizing in the case of videos, images, etc. In addition, an application providing a UI screen may be prestored with UI information corresponding to the first screen (i.e., the entire screen) and the second screen (i.e., a partial screen).

Otherwise, the controller 130 may transmit size information of the second screen to an external server (not illustrated), and receive screen information corresponding to the size information transmitted from the server and display a screen corresponding to the second screen. In this case, the screen information may include information corresponding to the third screen generated in the remaining area other than the second screen in the display unit 100 besides the information corresponding to a part or an entirety of the second screen.

The configuration of displaying a screen corresponding to the second screen as aforementioned may be applied in the same manner to the case of displaying a screen corresponding to the third screen, but a detailed explanation is omitted.

In addition, the controller 130 may reconfigure the first contents according to the user's eyeline.

More specifically, the controller 130 may determine a display perspective of the second screen generated based on the bending according to the user's eyeline direction, and control to change the first contents to correspond to the determined display perspective and display the result, Accordingly, the flexible display apparatus may further include an eyeline detector (not illustrated) configured to detect the user's eyeline direction.

Herein, a display perspective refers to applying perspective (sense of distance and proximity) on a 2 dimensional plane such as a display as if actually seen by eyes. More specifically, it may be a display method of making the objects displayed to have perspectives at the user's point of view according to the user's eyeline location and direction.

For example, a penetrating perspective method may be applied as a display method. Herein, a vanishing point, which is a point where a line meets another line when an extension line of an object is drawn in a penetrating manner, may be used to illustrate a sense of distance or composition. A 1 point vanishing point penetrating method is also called a parallel line perspective method. This method may be used when there is one vanishing point having a great sense of concentration, and when expressed in a diagonal composition. A 2 point vanishing point penetrating method is also called an oblique line perspective method. In this method, there are 2 vanishing points that may be located in left and right sides of the screen. A 3 point vanishing point penetrating method is also called a space perspective method. In this method, there are 3 vanishing points that may be located in a left-right side, an upper side or a bottom side of the screen. Display shapes according to the various embodiments of the present disclosure where the aforementioned perspective methods are applied will be explained in further detail with reference to the drawings.

Meanwhile, an eyeline detector (not illustrated) detects the area that the user gazes at in the display unit 110. Herein, the eyeline detector (not illustrated) may track the direction of the user's face or movement of the user's eyeballs to detect the area at which the user gazes.

More specifically, the eyeline detector (not illustrated) identifies an eyeball image from the user photographed images photographed by a camera (not illustrated) through face modeling technology. Herein, the face modeling technology is an analyzing process of converting face images obtained by the camera into digital information for processing and transmitting. Either an Active Shape Modeling (ASM) method or an Active Appearance Modeling (AAM) may be used as the face modeling technology. In addition, the eyeline detector (not illustrated) may use the identified eyeball image to determine the movement of the eyeballs. In addition, the eyeline detector (not illustrated) may use the movement of the eyeballs to detect the direction in which the user gazes, and compare the coordinate information of the prestored display screen with the direction in which the user gazes, thereby determining the area at which the user gazes.

The method of determining the area at which the user gazes is just an embodiment, and thus it is possible to determine the area at which the user gazes using other methods. For example, the eyeline detector (not illustrated) may track the direction of the user's face to determine the area at which the user gazes.

In addition, the controller 130 may determine the display perspective of the second screen considering not only the user's eyeline direction but also the display direction according to the bending angle, and may control to change the first contents to correspond to the display perspective and to display the result. More specifically, the controller 130 may consider the user's eyeline direction and the display direction according to the bending at the same time so as to display in the display angle that could be perceived by the user most effectively. For example, the bending angle and the display angle of the second screen may be inversely proportional. Of course, the disclosure is not limited thereto.

In addition, the controller 130 may further use the distance between the display unit 110 and the user, especially, the user's face or the user's eyeballs to determine the display perspective. Accordingly, the flexible display apparatus 100 may further include a distance measurer (not illustrated). The distance measurer (not illustrated) may include a light emitter configured to emit light to a subject and a light receiver configured to receive the light reflected from the subject, and the distance measurer may measure the distance to the subject through the light emitter and the light receiver.

As aforementioned, the controller 130 may control to display information related to the first contents on the third screen generated on another area based on the bending.

Herein, the information related to the first contents may be at least one of a first contents list including second contents of the same level as the first contents, a second contents list including superior categories of the first contents and other categories of the same level, and information for executing functions related to the first contents. For example, when the first contents is A movie contents, the contents list including B movie contents and C movie contents may become the first contents list, and the contents list including the movie category and news category, drama category, and music category which are superior categories of the first contents may be the second contents list.

Furthermore, the information related to the first contents may be a sub category list including sub categories of the same level as the corresponding sub category when the first contents belongs to a particular sub category. For example, when the first contents is a particular movie contents, and the corresponding movie contents belongs to a sub category of action, the sub category list including other sub categories such as comedy, etc. may be displayed on the third screen.

The controller 130 may determine the display perspective on the third screen based on at least one of the aforementioned user's eyeline direction and bending angle of the bending input, and may control to change the information related to the first contents displayed on the third screen to correspond to the determined display perspective and display the result.

With the first contents displayed on the second screen, the controller 130 may control so that when edge surfaces of the flexible display apparatus 100 each belonging to the second screen and the third screen are arranged to touch the support surface, a screen for selecting other contents is displayed on the third screen of the divided screen. For example, a first contents list including the second contents of the same level as the first contents, and a second contents list including the superior category of the first contents etc. may be displayed.

In addition, with the first contents displayed on the second screen, when a surface of the flexible display apparatus 100 to which the second screen and the third screen each belongs is arranged to touch the support surface, the controller 130 may control to display a screen for performing functions related to the first contents on the third screen.

In addition, the controller 130 may control to display objects in different shapes according to the bending angle.

More specifically, the controller 130 may change the display object and display shape according to the bending angle and display the result, as illustrated in Table 1 below.

TABLE 1

| Bending angle | Display format |
| --- | --- |
| 180°- When the display is flat | Display in full screen shape (for example, watching movie) |
| | In the case of a dual display, display ½ the left screen and display the remaining ½ on the right screen |
| | Display nth page on the left side, and display n + 1th page on the right side(for example, 2-book) |
| When approached by 90° (+/−30°), that is 60°~120° | Detect the user eyeline angle regarding the right surface and display such that the object displayed on the left surface is extended |
| | When necessary, it is possible to display a menu screen on the right surface |
| When the display is completely folded | Convert into display turn off/system waiting mode |
| When changed from 0° to 90° | Convert to lock screen at waiting mode |
| When changed from 90° to 180° | When 90 degree is at a lock display stat, convert task until entering an unlock waiting state |
| When changed from 180° to 90° | Display the superior category of the contents displayed at 180 degrees and categories of the same level as the corresponding superior category on the left and right screens |

The flexible display apparatus 100 may sometimes be embodied to have a dual screen. That is, the flexible display apparatus 100 may have two Electronic Paper Displays (EPDs).

For example, on the EPD, sequential pages such as an e-book, a newspaper, etc. (i.e., nth page, n+1th page) are displayed. Accordingly, it can be said that provision of an e-book of a dual screen e-book terminal is made in the same method as an actual book.

Meanwhile, the flexible display apparatus 100 may further include a communicator (not illustrated) configured to perform a video call with a counterpart terminal (not illustrated).

In this case, the controller 130 may display a video call image on a second screen generated on an area of the display unit 110 based on the bending, and control to display an object for sharing contents with the video call counterpart on the third screen generated on another area of the display unit 110 based on the bending.

In addition, the controller 130 may transmit the object selected by the user of the objects displayed on the third screen to the vide call counterpart terminal (not illustrated). Herein, a selection by the user may be an operation of selecting an object and sending the selected object to the second screen through manipulations such as a touch and flick, and touch and drag etc.

More specifically, on the second screen where the video call counterpart image is displayed, there may be provided an area for displaying the object to be transmitted to the counterpart terminal (not illustrated), and in the case of selecting an object and sending the object to the corresponding area, the selected object may be transmitted to the counterpart terminal (not illustrated).

In addition, in the case of performing a video call with a plurality of counterparts, the second screen may be divided into a plurality of screens and each screen may display each video call image corresponding to the plurality of counterparts.

However, the disclosure is not limited thereto, and thus operations corresponding to the bending of the flexible display apparatus 100 according to the present disclosure may be embodied in various formats according the type of the flexible display apparatus 100. For example, when the flexible display apparatus 100 is a mobile phone, the controller 130 may perform functions corresponding to the bending input according to various embodiments of the present disclosure of the various functions such as call connection, call rejection, menu display, text messaging, select and execute application, execute and end web browser, etc.

In another example, when the flexible display apparatus 100 is a TV, the flexible display apparatus 100 may perform functions corresponding to the bending input according to various embodiments of the present disclosure of the various functions such as selecting channels, adjusting volume, adjusting brightness, adjusting color, adjusting contrast, etc. In another example, when the flexible display apparatus 100 is an e-book, the flexible display apparatus may perform functions corresponding to the bending input according to various embodiments of the present disclosure of the functions such as memo display, showing a bookmark page, fast forward, a highlighting function, a secret storage function, a viewing summary function, a combining pages function, etc.

Besides the above, the flexible display apparatus 100 may be embodied in various types of display apparatuses such as a PDA, an electronic frame, an electronic note, an MP3 player, a tablet PC, a laptop computer, a monitor, etc.

In addition, in some cases, the flexible display apparatus 100 may further include a hinge (not illustrated).

The hinge (not illustrated) may be mounted onto at least one area where the flexible display apparatus 100 is bendable. For example, the hinge may be arranged in a central area in a horizontal direction of the flexible display apparatus 100. The hinge (not illustrated) may further include a hinge sensor (not illustrated) which may sense the extent of bending in the area where it is mounted. Meanwhile, when a bending is made around the hinge (not illustrated), two display areas divided around the bending line may be closed to touch each other, or may be completely folded in the opposite direction and be opened such that the rear surfaces touch each other.

Meanwhile, as aforementioned, the display unit 110 must be made in such a manner that it is bendable. The sensor 120 may sense the state of the bending in various methods.

Herein below is an explanation on a configuration of a display unit and a method of sensing bending accordingly.
<Example of a Structure of a Flexible Display Unit and a Method for Sensing that Bending>

Figure 2:
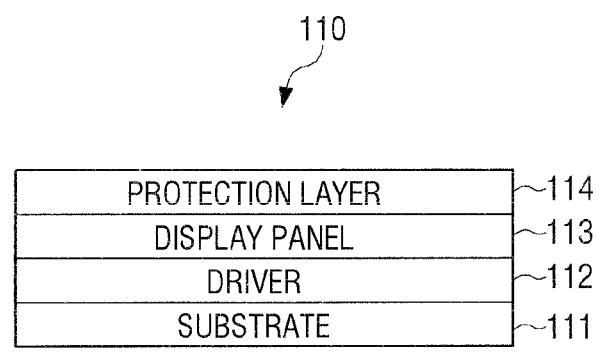
FIG. 2 is a view for explaining a basic structure of a display unit configuring a flexible display apparatus in accordance with an embodiment of the present disclosure.

FIG. 2 is a view for explaining a basic structure of a display unit configuring a flexible display apparatus according to an embodiment of the present disclosure.

Referring to FIG. 2, the display unit 110 includes a substrate 111, driver 112, display panel 113 and a protection layer 114.

A flexible display apparatus 100 refers to an apparatus that may be bent, curved, folded or rolled like paper while keeping the characteristics of a flat display apparatus. Therefore, a flexible display apparatus must be made on top of a flexible substrate.

More specifically, a substrate 111 may be embodied as a plastic substrate (for example, a high molecular film) that may be changed by external pressure.

A plastic substrate has a structure that includes a barrier coating on both surfaces on top of a base film. The base film may be embodied using various types of plastic such as Polyimide (PI), Polycarbonite (PC), Polyethyleneterephtalate (PET), Polyethersulfone (PES), Polythylenenaphthalate (PEN), Fiber Reinforced Plastic (FRP), etc. In addition, the barrier coating is located on opposing surfaces in the base film, and organic or inorganic films may be used in order to maintain flexibility.

For the substrate 111, a material having flexible characteristics such as thin glass or metal foil may be used besides a plastic substrate.

The driver 112 plays a function of driving the display panel. More specifically, the driver 112 applies a driving voltage to a plurality of pixels configuring the display panel 113, and may be embodied using amorphous-silicon (a-si) Thin Film Transistor (TFT), Low Temperature Poly Silicon (LTPS) TFT, Organic TFT (OTFT), etc. The driver 112 may be embodied in various formats corresponding to the formats of the display panel 113. For example, the display panel 113 may consist of an organic emitting body made of a plurality of pixels and an electrode layer covering both surfaces of the organic emitting body. In this case, the driver 112 may include a plurality of transistors corresponding to each pixel of the display panel 113. The controller 130 applies an electric signal to a gate of each transistor and emits a pixel connected to the transistor. Accordingly, an image may be displayed.

Otherwise, the display panel 113 may be embodied using ElectroLuminescence (EL), an Electrophoretic Display (EPD), an Electrochromic Display (ECD), a Liquid Crystal Display LCD), an Active Matrix LCD (AMLCD), a Plasma Display Panel (PDP), etc. besides an organic light emitting diode. However, in the case of an LCD, an additional backlight is required in that the LCD cannot emit light for itself. Therefore, in order to use an LCD display panel 113 without backlight, conditions such as outdoor environment having sufficient light must be satisfied.

The protection layer 114 plays a function of protecting the display panel 113. For the protection layer 114, materials such as ZrO, $CeO_2$, $ThO_2$, etc. may be used. The protection layer 114 may be made having a transparent film format and covering the entire surface of the display panel 113.

As illustrated in FIG. 2, the display unit 110 may be embodied as an electronic paper display. Electronic paper is a display where general characteristics of ink have been applied, and a difference from a general flat panel display is that it uses reflected light. In the case of electronic paper, it is possible to change a picture or letter using a twist ball or electrophoresis using capsules.

When the display unit 110 is made of transparent configurative elements, it may be embodied in a display apparatus having bendable and transparent characteristics. For example, the substrate 111 may be embodied using a polymer material such as plastic having transparent characteristics, and the driver 112 may be embodied using a transparent transistor. When the display panel 113 is embodied in a transparent organic light emitting layer or a transparent electrode, it may have transparency.

A transparent transistor refers to a transistor made by substituting the nontransparent silicone used for a typical TFT with transparent material such as transparent zinc oxide and titanium oxide etc. In addition, a new material such as Indium Tin Oxide (ITO) or graphene may be used for the transparent electrode. Graphene refers to a material used to form a flat panel structure where carbon atoms are connected to one another and having transparent characteristics. Besides, the transparent organic light emitting layer may be embodied in various materials.

FIGS. 3, 4, 5, 6, and 7 are views for explaining a method for sensing a bending in accordance with an embodiment of the present disclosure.

Figure 3:
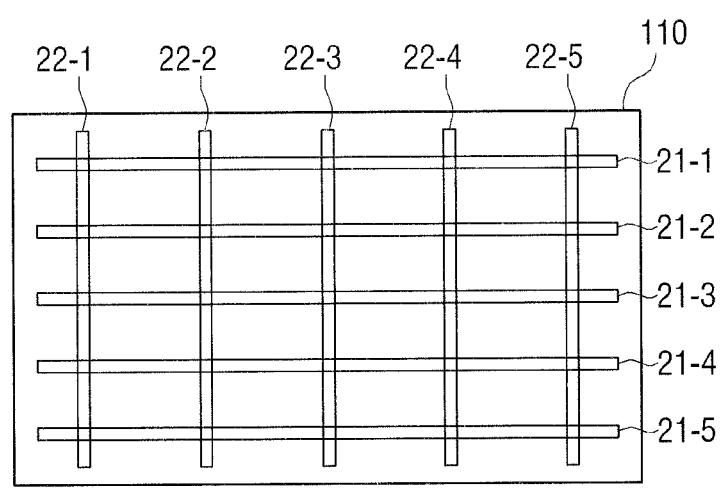
FIGS. 3, 4, 5, 6, and 7 are views for explaining a method for sensing a bending in accordance with an embodiment of the present disclosure.

FIG. 3 is a view for explaining a bending sensing method for sensing a bending according to an embodiment of the present disclosure.

Referring to FIG. 3, a flexible display apparatus 100 may be bent by external pressure and thus its shape may be changed. A bending may include a normal bending, folding, rolling, etc. Herein, a normal bending refers to a state where a flexible display apparatus is bent.

A folding refers to a state where the flexible display apparatus is folded. Herein, a folding and general bending may be differentiated by the extent of the bending. For example, when a bending is made to or more than a certain bending degree, the bending is defined as a folded state, and when a bending is made to less than a certain bending degree, the bending is defined as a general bending.

A rolling refers to a state where the flexible display apparatus is rolled up. Rolling may also be determined by a bending angle. For example, a state where a bending to or above a certain angle is sensed along an entire area may be defined as a rolling. On the other hand, a state where a bending is sensed to an angle less than a certain bending angle in a relatively smaller area than rolling may be defined as a folding. The aforementioned normal bending, folding, rolling, etc. may be determined based on the bending radius besides the bending angle.

In addition, if a cross section of the flexible display apparatus 100 is substantially a circle or an oval, such a state may be defined as a rolling state regardless of the bending radius.

However, the aforementioned definitions of changed shapes are just examples, and thus different definitions may be made according to a type, size, weight, and characteristics of the flexible display apparatus. For example, when a bending is possible such that the surface of the flexible display apparatus 100 can touch itself, a folding may be defined as a state where an apparatus surface touches itself while it is bent. On the other hand, a rolling may be defined as a state where the front surface and the back surface of the flexible display apparatus touch each other due to bending.

Herein below is an explanation on a normal bending state according to an embodiment of the present disclosure for convenience of explanation.

A flexible display apparatus 100 may sense a bending in various methods.

For example, a sensor may include a bend sensor arranged on one surface such as a front surface or a back surface of the display unit or a bend sensor arranged on both surfaces. The controller may sense the bending using the value sensed in the bend sensor.

Herein, the bend sensor refers to a sensor that may bend by itself, and of which resistance values change according to the extent of the bending. The bending sensor may be embodied in various shapes such as an optic fiber bend sensor, a pressure sensor, a strain gauge, etc.

The sensor may sense a resistance value of a bend sensor using the magnitude of the voltage applied to the bend sensor or the magnitude of the current flowing in the bend sensor, and may sense the bending state at the corresponding bend sensor according to the size of that resistance value.

FIG. 3 illustrates a state where the bend sensor is embedded in the front surface of the display unit 110, but this is just an example, and thus the bend sensor may be embedded in the back surface or in both surfaces of the display unit 110. In addition, the shape, number, and arrangement location of the bend sensor may be changed variously. For example, one or a plurality of bend sensors may be combined in the display unit 110. Herein, one bend sensor may sense one bending data, but one bend sensor may have a plurality of sensing channels that sense a plurality of bending data.

FIG. 3 illustrates an example where a plurality of bar-shaped bend sensors are arranged in horizontal and vertical directions to for a lattice shape.

Referring to FIG. 3, a bend sensor includes bend sensors 21-1, 21-2, 21-3, 21-4, and 21-5 configured in a first direction and bend sensors 22-1, 22-2, 22-3, 22-4, and 22-5 configured in a second direction orthogonal to the first direction. Each bend sensor may be spaced from each other by a certain distance.

Referring FIG. 3, five bend sensors 21-1 to 21-5, 22-1 to 22-5 are arranged in the horizontal and vertical direction, respectively, but this is just an example, and thus the number of bend sensors may of course be changed according to the size of the flexible display apparatus. As such, since the reason the bend sensors are arranged in horizontal and vertical directions is to sense the bending made in the entirety of the flexible display apparatus, in cases where just a portion has flexible characteristics or where it is only necessary to sense the bending of just a portion, bend sensors may be arranged in the corresponding portion only.

Figure 4:
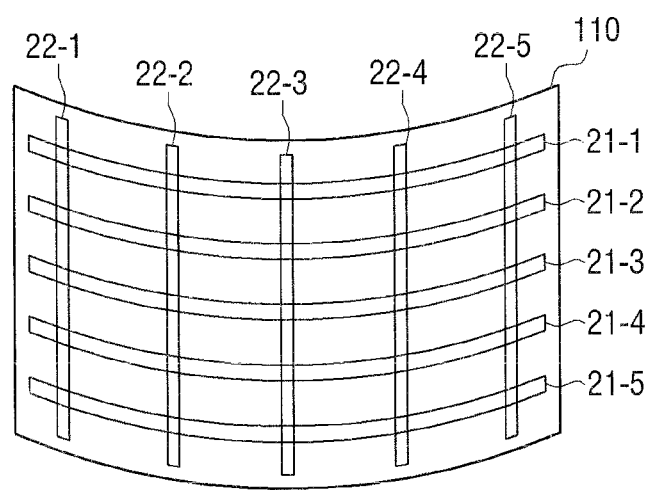

Each bend sensor 21-1 to 21-5, 22-1 to 22-5 may be embodied as an electric resistance type sensor or a micro optical fiber type sensor using the strain of optical fiber. Herein below is described a case where the bend sensor is embodied in an electric resistance type sensor for convenience of explanation More specifically, when a central area of the left and right edges of the flexible display apparatus 100 is bent to face a lower direction, the tension by the bending is applied to the bend sensors 21-1 to 21-5 arranged in the horizontal direction. Accordingly, the resistance value of each bend sensor 21-1 to 21-5 arranged in the horizontal direction changes. The sensor may sense changes of the output values output from each bend sensor 21-1 to 21-5 to sense that a bending is made in the horizontal direction. FIG. 4 illustrates a state where the central area is bent in the vertical lower direction (herein below referred to as the Z− direction) from the display surface, but it is also possible to sense that a bending is made based on changes of the output values of the bend sensors 21-1 to 21-5 in the horizontal direction even when a bending is made in the vertical upper direction (herein below referred to as the Z+ direction) from the display surface.

Figure 5:
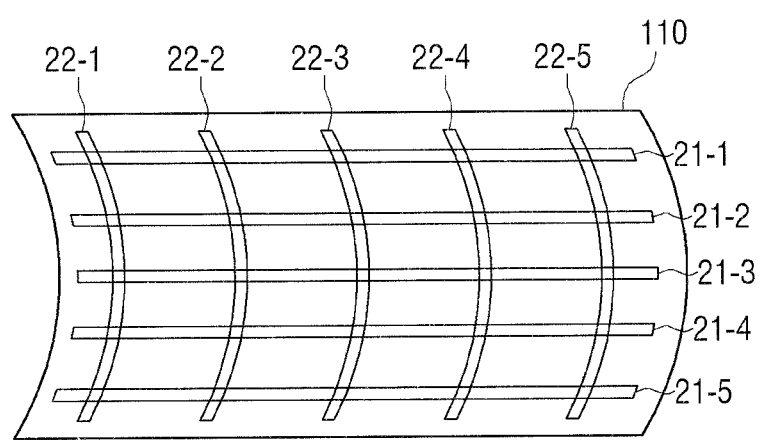

In addition, as illustrated in FIG. 5, when the shape of the flexible display apparatus 100 is bent such that the central area of the upper and lower edges of the flexible display apparatus is bent to face the upper direction, the tension is applied to the bend sensors 22-1 to 22-5 arranged in the vertical direction. The sensor may sense the change of shape in the vertical direction based on the output values of the bend sensors 22-1 to 22-5 arranged in the vertical direction. FIG. 5 illustrates a bending in the Z+ direction, but a bending in the Z− direction may of course be sensed using the bend sensors 22-1 to 22-5 arranged in the vertical direction as well.

In the case of a change of shape in a diagonal direction, since the tension is applied to all the bend sensors arranged in the horizontal and vertical directions, it is possible to sense the change of shape in the diagonal direction based on the output value of the bend sensor arranged in the horizontal and vertical directions as well.

Herein below is an explanation on a method of sensing each change of shape such as a normal bending, folding, and rolling using a bend sensor.

Figure 6:
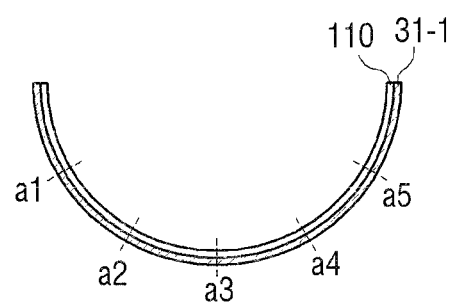
Figure 7:
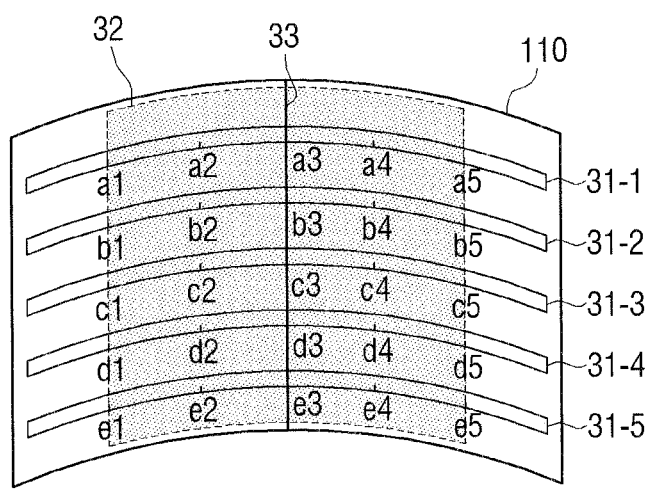

FIGS. 6 and 7 are views for explaining a method for sensing a bending in a flexible display apparatus using a bend sensor according to an embodiment of the present disclosure.

FIG. 6 illustrates a cross-sectional view of the flexible display apparatus when it is bent.

When the flexible display apparatus is bent, the bend sensor arranged on one surface or both surfaces of the flexible display apparatus are bent altogether, and thus there is provided a resistance value corresponding to the intensity of the tension applied, and an output value corresponding there is output.

For example, when the flexible display apparatus is bent as in FIG. 6, a bend sensor 31-1 arranged on the back surface of the flexible display apparatus is bent as well, and a resistance value according to the intensity of the tension applied is output.

In this case, the intensity of the tension increases in proportion to the extent of the bending. For example, when a bending is made as in FIG. 6, the extent of the bending in the central area becomes the greatest. Therefore, the greatest tension is applied to the bend sensor 31-1 arranged at the central area a3 point, and accordingly the bend sensor 31-1 has the greatest resistance value at this point. On the other hand, the bending gets weaker towards the outside areas. Accordingly, based on a3 point, the bend sensor 31-1 has smaller resistance values as it gets closer to a2, a1 points or closer to a4 a5 points.

When the resistance value output from the bend sensor 31-1 has a maximum value at a particular point and gets smaller as it gets closer to the outside, the sensor 120 may determine that the area having the greatest resistance value is an area where the greatest bending occurred. In addition, the sensor 120 may determine that the area for which the resistance value has not changed is a flat area where a bending has not been made, and may determine that the area for which the resistance value has changed for or more than a certain size as an area where a bending has been made even by a small extent.

FIG. 7 is a view for explaining a method of defining a bending area in an embodiment of the present disclosure. More specifically, FIG. 7 is a view for explaining a case where the flexible display apparatus is bent in the horizontal direction based on the front surface, and thus bend sensors arranged in the vertical direction were not illustrated for convenience of explanation. Furthermore, for convenience of explanation, reference numerals for each bend sensor have been given differently in every view, but the bend sensors as those illustrated in FIG. 3 may be used as they are.

A bending area refers to an area where the flexible display apparatus is bent and curved. The bend sensor is bent together by the bending, and thus a bending area may be defined as any point where a bend sensor outputting a different resistance value than that of an original state is arranged.

The sensor 120 may sense a size of the bending line, a direction of the bending line, a location of the bending line, a number of the bending line, a number of times of the bending line, a speed of the bending where the shape changes, a size of the bending area, a location of the bending area, a number of the bending area, etc. based on the relationship among the points where a change of resistance value has been sensed.

More specifically, the sensor 120 senses the points outputting resistance values as one bending area if the distance among the points for which a change of resistance value has been sensed is within a certain distance. On the other hand, if there exists points where the distance therebetween is greater than a certain distance among the points for which a change of resistance value has been sensed, different bending areas may be defined based on those points. A more detailed explanation will be made with reference to FIG. 7.

FIG. 7 is a view for explaining a method for sensing one bending area. As in FIG. 7, when a flexible display apparatus 100 is bent, from a1 point to a5 point of the bend sensor 31-1, from b1 point to b5 point of the bend sensor 31-2, from c1 point to c5 point of the bend sensor 31-3, from d1 point to d5 point of bend sensor 31-4, and e1 point to e5 point of the bend sensor 31-5 become to have different resistance values from those of the original state.

In this case, the points for which a change of resistance value has been sensed in each bend sensor 31-1 to 31-5 are arranged sequentially within a certain distance from one another.

Therefore, the sensor 120 senses the area 32 including the area from a1 point to a5 point of the bend sensor 31-1, from b1 point to b5 point of the bend sensor 31-2, from c1 point to c5 point of the bend sensor 31-3, from d1 point to d5 point of bend sensor 31-4, and e1 point to e5 point of the bend sensor 31-5 as one bending area.

Meanwhile, a bending area may include a bending line. A bending line may be a line connecting different points that output the maximum value in the bend sensor. That is, it may be defined as a line that connects the points from which the greatest resistance values have been detected in each bending area.

For example, in the case of FIG. 7, the line 33 that connects a3 point which outputs the greatest resistance value in the bend sensor 31-1, b3 point outputting the greatest resistance value in the bend sensor 31-2, c3 point that outputs the greatest resistance value in the bend sensor 31-3, d3 point that outputs the greatest resistance value in the bend sensor 31-4, and e3 point that outputs the greatest resistance value in the bend sensor 31-5 may be defined as the bending line. FIG. 7 illustrates a state where the bending line is formed in the central area of the display surface in a vertical direction.

Figure 8:
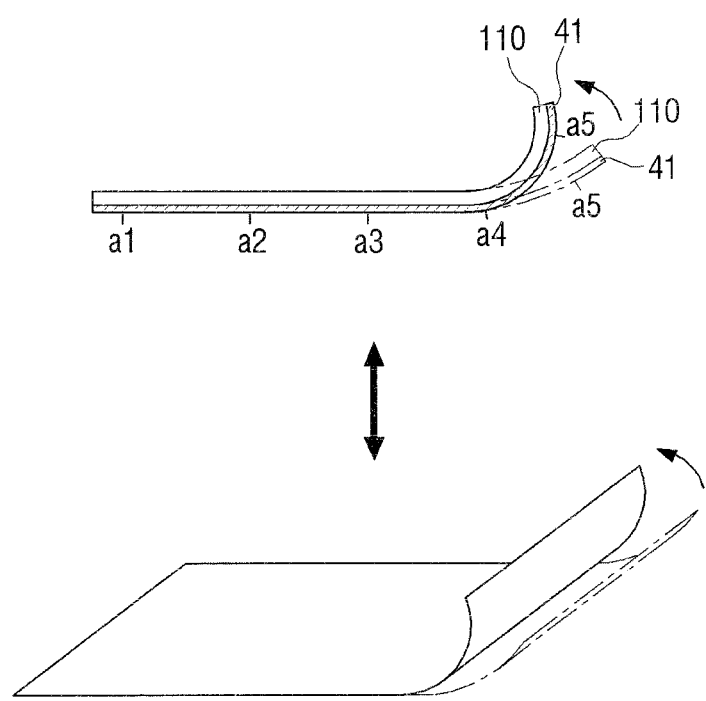
FIGS. 8, 9, 10, 11, 12, 13, 14, 15, 16, and 17 are views for explaining a method for determining a degree of bending in accordance with various embodiments of the present disclosure.

FIG. 8 is a view for explaining a method for determining an extent of bending according to an embodiment of the present disclosure.

Referring to FIG. 8, the flexible display apparatus 100 uses the change of size of resistance values output per particular distance in the bend sensor to determine the extent of bending of the flexible display apparatus, that is the bending angle.

More specifically, the controller 130 determines the difference between the resistance value of the point where the greatest resistance value has been output and the resistance value output in the point distanced from the first point by a certain distance.

In addition, the controller 130 may determine the extent of bending using the difference of the calculated resistance values. More specifically, the display apparatus 100 may divide the extent of the bending into a plurality of levels, match a resistance value having a certain range for each level, and store the same.

Accordingly, the flexible display apparatus may determine the extent of bending of the flexible display apparatus according to the level it belongs to among the plurality of levels divided according to the extent of bending.

For example, as illustrated in FIG. 8, the flexible display apparatus may determine the extent of bending based on the difference of the resistance value output from a5 point which outputs the greatest resistance value in the bend sensor 41 provided on the back surface of the flexible display apparatus 100 and the resistance value output in a4 point which is distanced by a certain distance.

More specifically, among the prestored plurality of levels, it is possible to check the level that the difference of the resistance value calculated in the embodiment illustrated in FIG. 8 belongs to, and determine the extent of bending that corresponds to the checked level. Herein, the extent of bending may be expressed in the bending angle or bending intensity.

Meanwhile, as illustrated in FIG. 8, when the extent of bending increases, the difference between the resistance value output from the bend sensor a5 point and the resistance value output from a4 point increases compared to the existing resistance value difference. Accordingly, the controller 130 may determine that the extent of bending increased.

Meanwhile, as aforementioned, the bending direction of the flexible display apparatus 100 may change to, for example Z+ direction or Z− direction.

Figure 9:
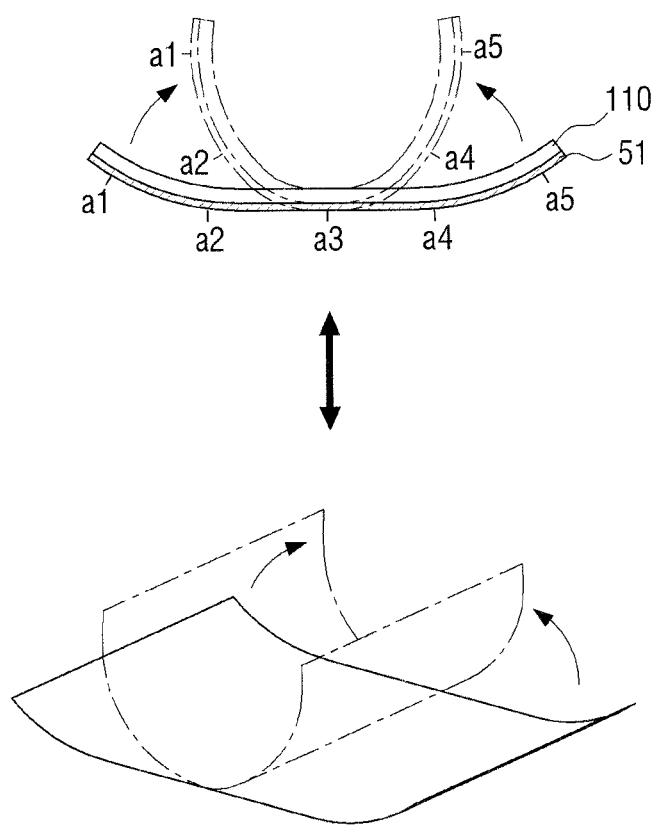

FIG. 9 is a view for explaining a method for determining the extent of bending according to an embodiment of the present disclosure.

Referring FIG. 9, the extent of bending may be determined through changes of bending radius R. A size of bending radius R is determinable through the differences of resistance values of each point of bend sensor 51 as illustrated in FIG. 8, and thus a detailed explanation is omitted.

Figure 10:
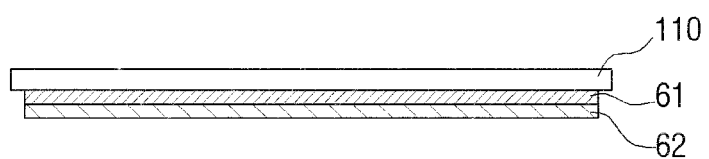
Figure 11:
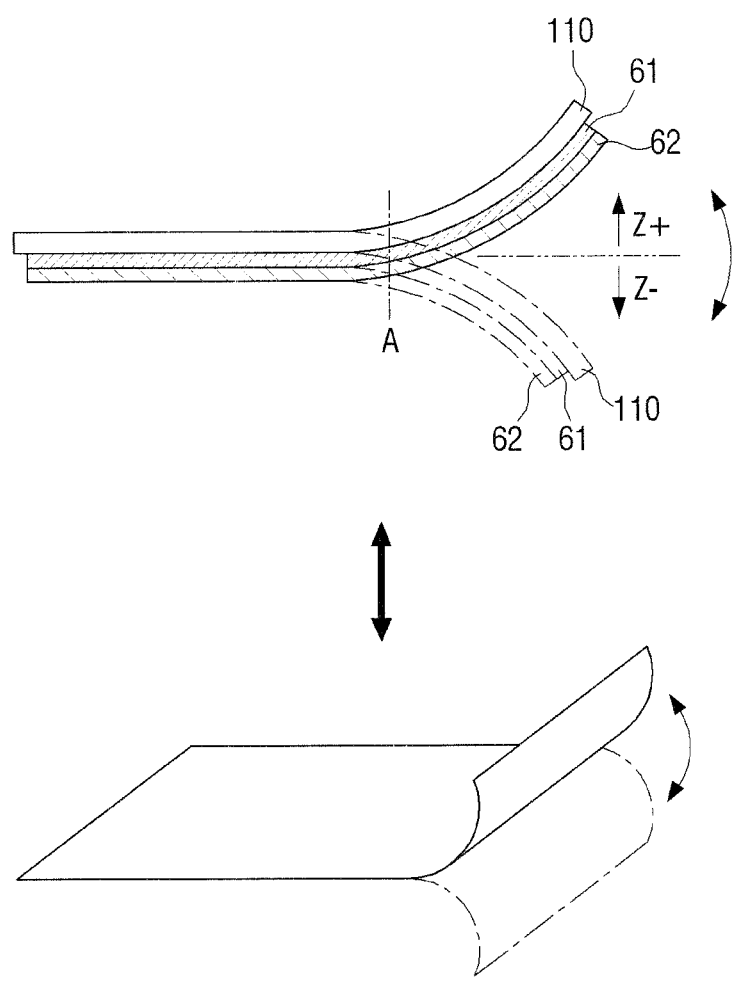

Meanwhile, the bending direction may be sensed by any of various methods. For example, it is possible to arrange two bend sensors in an overlapping manner and determine the bending direction according to the difference of size change of the resistance value of each bend sensor. FIGS. 10 and 11 explain methods for sensing the bending direction using the overlapped bend sensors according to embodiments of the present disclosure.

Referring to FIG. 10, on one side of the display unit 110, two bend sensors 61, 62 may be provided overlapping each other. In this case, when a bending is made in one direction, different resistance values of the upper bend sensor 61 and the lower bend sensor 62 are detected. Therefore, it is possible to know the bending direction by comparing the resistance values of the two bend sensors 61, 62 at the same point.

More specifically, as illustrated in FIG. 11, when the flexible display apparatus 100 is bent in Z+ direction, at A point corresponding to the bending line, a greater tension is applied to the bend sensor 62 placed lower than the upper bend sensor 61.

On the other hand, when the flexible display apparatus 100 is bent in the back surface direction (i.e., the Z− direction), a greater tension is applied to the upper bend sensor 61 than the lower bend sensor 62.

Therefore, the controller 130 may compare the resistance values at two bend sensors 61, 62 corresponding to A point and sense the bending direction.

FIGS. 10 and 11 illustrate a state where two bend sensors are arranged at one side of the display unit 110 to overlap each other according to an embodiment of the present disclosure. However, the bend sensors may also be arranged on both surfaces of the display unit 110.

Figure 12:
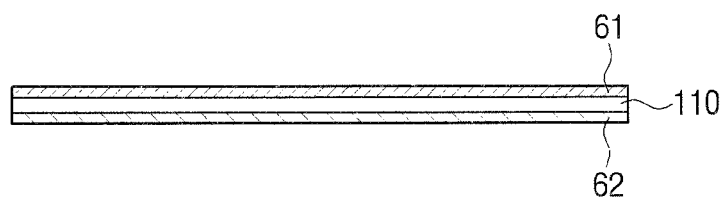

FIG. 12 illustrates a state where two bend sensors 61, 62 are arranged on both surfaces of the display unit 110 according to an embodiment of the present disclosure.

Referring to FIG. 12, when the flexible display apparatus 100 is bent in the first direction (herein below Z+ direction) which is vertical to the screen, the bend sensor arranged on the first surface of the two surfaces of the display unit 110 receives a compressive force, whereas the bend sensor arranged on the second surface receives tension. On the other hand, when the flexible display apparatus 100 is bent in the second direction (herein below Z− direction) which is the opposite direction to the first direction, the bend sensor arranged on the second surface receives a compressive force whereas the bend sensor arranged on the first surface receives tension. As such, difference values are detected in the two bend sensors according to the bending direction, and the controller 130 may differentiate the bending direction according to the detection characteristics of those values.

FIGS. 10 to 12 explained sensing the bending direction using two bend sensors, but it is also possible to differentiate the bending direction with only the strain gauge arranged on one surface of the display unit 110. That is, since compressive force or tension is applied according to its bending direction, it is possible to know the bending direction by simply checking the characteristics of its output value.

Figure 13:
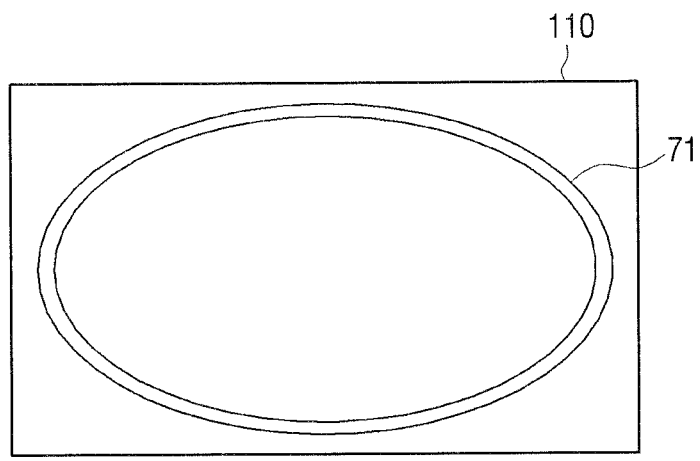

FIG. 13 illustrates a configuration where one bend sensor is arranged on one surface of a display unit 110 to sense the bending according to an embodiment of the present disclosure.

Referring to FIG. 13, the bend sensor 71 may be embodied as a closed curved line configuring a circular, square, or other polygonal shape, and may be arranged on the edge of the display unit 110. The controller 130 may determine the point where a change of output value is sensed on the closed curved line as the bending area. The bend sensor may be combined with the display unit 110 in an open curve line such as an S, Z, or other zigzag shape.

Figure 14:
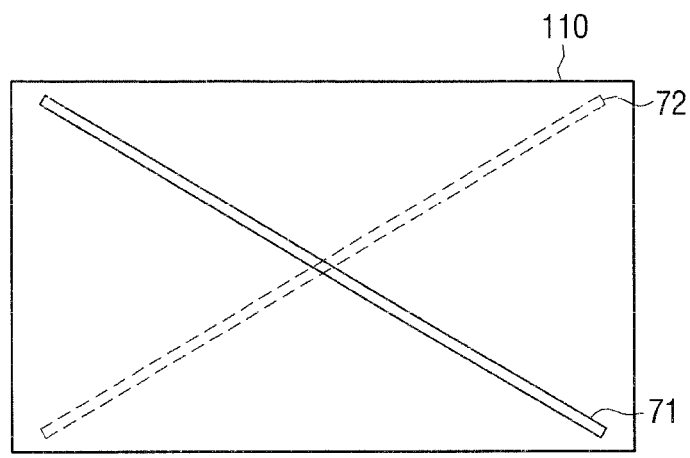

FIG. 14 illustrates two bend sensors arranged such that they intersect each other according to an embodiment of the present disclosure.

Referring to FIG. 14, the first bend sensor 71 is arranged on the first surface of the display unit 110, and the second bend sensor 72 is arranged on the second surface of the display unit 110. The first bend sensor 71 is arranged on the first surface of the display unit 110 in a first diagonal direction, and the second bend sensor 72 is arranged on the second surface in a second diagonal direction. Accordingly, the output values and output points of the first and second bend sensors 71, 72 differ depending on various bending conditions such as when each corner area is bent, each edge area is bent, the central part is bent, when folding or rolling is made, etc., and thus the controller 130 may determine which type of bending has been made according to such output value characteristics.

Meanwhile, the aforementioned various embodiments illustrate cases where line shape bend sensors are used, but it is also possible to sense a bending using a plurality of fragmentary strain gauges.

Figure 15:
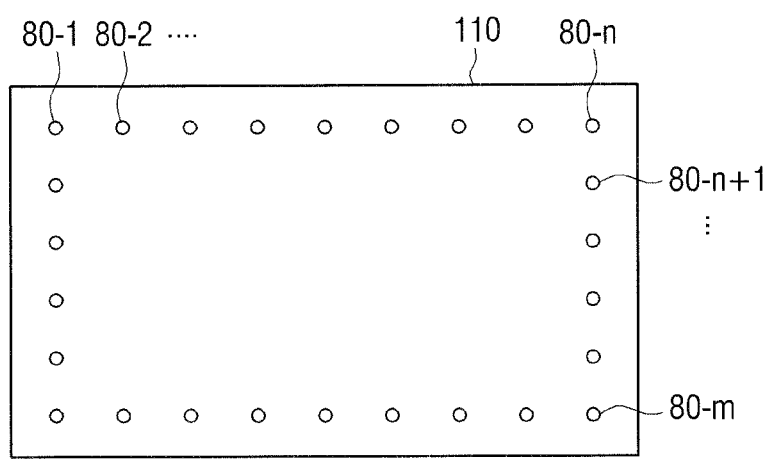
Figure 16:
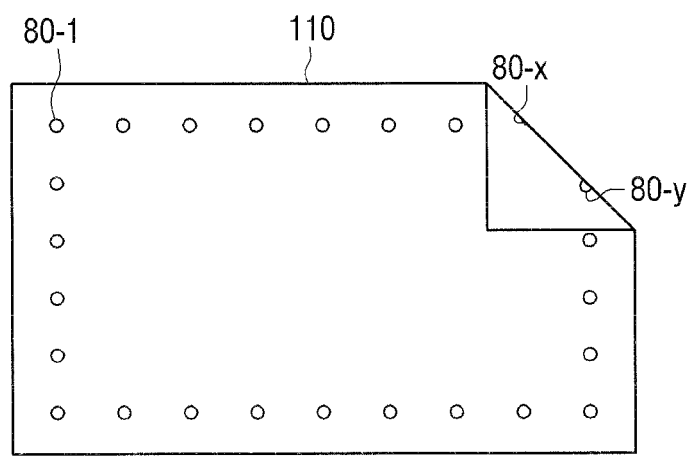

FIGS. 15 and 16 are views illustrating sensing a bending using a plurality of strain gauges according to an embodiment of the present disclosure. Using a strain gauge is to use metal or semiconductor of which the resistance changes significantly according to the size of the force applied, to sense the change on the surface of the measure object according to the change of that resistance value. Generally, in the case of metal, when the length gets longer due to external force, the resistance value increases, and when the length gets shorter, the resistance value decreases. Therefore, it is possible to determine whether or not a bending has been made by sensing the change of the resistance value.

Referring to FIG. 15, a plurality of strain gauges are arranged on the edge area of the display unit 110. The number of the strain gauges may differ according to the size, shape, certain bending sense resolution etc. of the display unit 110.

Meanwhile, the strain gauge may be arranged on one side or both sides of the display unit 110. When the strain gauge is arranged on both sides of the display unit 110, that is on the front and back surface of the display unit 110, the strain gauge arranged in the front surface direction may be embodied to sense the bending made concavely in the front surface direction, that is Z+ direction, and the strain gauge arranged in the back surface direction may be embodied to sense the bending made concavely in the back surface direction, that is, in the Z− direction.

When the strain gauge is arranged on one side, that is, on the front surface or back surface of the display unit 110, it may be embodied in a format to sense all the bendings in the front surface and the back surface of the display unit 110. For example, with the strain gauges arranged as in FIG. 15, the user may bend any point in any direction. More specifically, when one corner area is bent as in FIG. 16, among the strain gauges 80-1, 80-2, . . . 80-n arranged in the horizontal direction, a force is applied to the strain gauge 80-x overlapping the bending line. Accordingly, the output value of the corresponding strain gauge 80-x becomes greater than the output values of other strain gauges. In addition, among the strain gauges 80-n, 80-n+1, . . . 80-m arranged in the vertical direction, a force is applied to the strain gauge 80-y overlapping the bending line, thereby changing the output value. The controller 120 may determine that the line which connects the two strain gauges 80-x, 80-y of which the output values have changed as the bending line.

Otherwise, different from what was explained in FIGS. 11 to 16, the flexible display apparatus 100 may sense a bending direction using various sensors such as a gyro sensor, a geomagnetic sensor, an acceleration sensor, etc.

Figure 17:
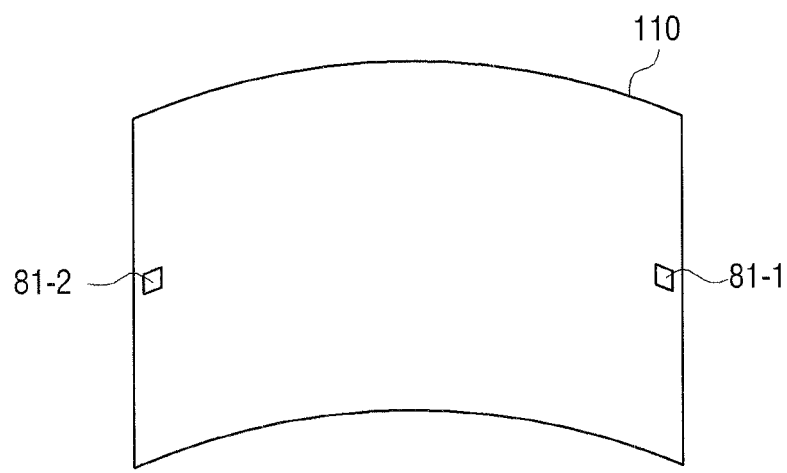

FIG. 17 is a view for explaining a method for sensing a bending direction using an acceleration sensor according to an embodiment of the present disclosure.

Referring to FIG. 17, the flexible display apparatus 100 includes a plurality of acceleration sensors 81-1, 81-2.

The acceleration sensors 81-1, 81-2 are sensors capable of measuring the acceleration of a movement and the direction of the acceleration. More specifically, the acceleration sensors 81-1, 81-2 output the sensing values corresponding to the acceleration of gravity that changes according to the gradient of the apparatus where the sensor is attached. Therefore, when acceleration sensors 81-1, 81-2 are each arranged on an edge area of the flexible display apparatus, the output value sensed in each acceleration sensor 81-1, 81-2 whenever the flexible display apparatus is bent changes. The controller 130 uses the output value sensed in each acceleration sensor 81-1, 81-2 to calculate the pitch angle and the roll angle. Accordingly, it is possible to determine the bending direction based on the extent of change of the sensed pitch angle and roll angle.

FIG. 17 illustrates a flexible display apparatus 100 having acceleration sensors 81-1, 81-2 arranged on edges in the horizontal direction based on the front surface, but either of the acceleration sensors 81-1, 81-2 may be arranged in the vertical direction. In this case, when the flexible display apparatus 100 is bent in the vertical direction, it is possible to sense the bending direction according to the measured value sensed in each acceleration sensor 81-1, 81-2 in the vertical direction.

Meanwhile, according to other various embodiments, acceleration sensors may be arranged on upper, lower, left, and right edges, or on all corner areas.

It is possible to sense the bending direction using a gyro sensor or a geomagnetic sensor besides the aforementioned acceleration sensor. The gyro sensor is a sensor which measures the Coriolis force which is applied in the speed direction and detects the angular speed, when a rotary motion occurs. It is possible to detect the direction of the rotation based on the measured value of the gyro sensor, and thus it is possible to sense the bending direction. A geomagnetic sensor is a sensor which senses the azimuth using the 2 axis or 3 axis flux gate. In the case of a geomagnetic sensor, when the edge portion of the geomagnetic sensor arranged on each edge portion of the flexible display apparatus 100 is bent, the location moves, and an electric signal corresponding to the change of geomagnetism corresponding thereto is output. The controller 130 uses the value output from the geomagnetic sensor to calculate the yaw angle. Accordingly, it is possible to determine various bending characteristics such as the bending area and bending direction according to the change of the calculated yaw angle.

As such, the flexible display apparatus 100 may sense the bending using various types of sensors. The aforementioned configuration of the sensor and method thereof may be applied individually to the flexible display apparatus 100, or may be applied in combinations.

Meanwhile, the sensor 120 may also sense manipulations by the user touching the screen of the display unit besides the bending.

More specifically, the sensor 120 may sense a touch using a touch electrostatic method, a pressure resistance film method, an infrared ray sense method, a surface ultrasound wave conduction method, an integral tension measurement method, a piezo effect method, etc.

Herein, a touch electrostatic method refers to a method of sensing a location by sensing changes of electrostatic capacity at the time of a touch by a finger.

In addition, the pressure resistance film method refers to when an upper surface and a lower surface touch each other by a pressing operation, and changes the resistance value and the voltage also changes due to the current flowing in each ends, location is sensed based on the extent of change of the voltage.

In addition, the infrared ray sense method refers to a method of sensing a location using the feature that when a user touches the screen with an object such as a finger that may block light on a monitor mounted on an Optp-Matrix frame, light emitted from the infrared light emitting diode is blocked and thus is not sensed in the photo transistor on the opposite side.

A surface ultrasound wave conduction method is a method of sensing time intervals of sound reflected and received through a transmitter and reflector embodied in a simple principle using the feature that ultrasound waves propagate along the surface and the propagation feature of sound that the distance proceeded for a certain period of time is constant.

When a user presses a corner with his/her a hand, the tension measurement device at the pressed side among the tension measurement devices provided at four corners receives the greatest force, and thus the force is converted into electrical signals according to the extent of the increase of the force and the electrical signals are delivered to the controller. Integral tension measurement method refers to the method of the controller calculating the ratio of electrical signals of four corners in such a case.

When a user touches a corner, the pressure applied to each of the four corners is different from one another depending on the extent of the pressures and locations. Piezo effect method is a method of calculating the ratio of electrical signals at four corners and figuring out the touch location in such a case.

For example, the sensor 120 may include a transparent conductive film such as ITO deposited on a substrate 111 inside the display unit 110 and a film formed on its upper side. Accordingly, when a user touches a screen, the upper and lower plates of the touched point contacts each other, delivering electrical signals to the controller 130. The controller 130 uses the coordinates of the electrode where electrical signals are delivered to perceive the touch point. Touch sensing methods were already disclosed in various prior documents and thus detailed explanation is omitted.

The controller 130 may divide the screen based on the sensed bending input, and display information corresponding to each divided screen based on the contents information displayed on the screen before the bending was input. Functions of the controller 130 are as aforementioned and thus a detailed explanation is omitted.

<Examples of Configurations of the Flexible Display Apparatus According to Various Embodiments>

Figure 18:
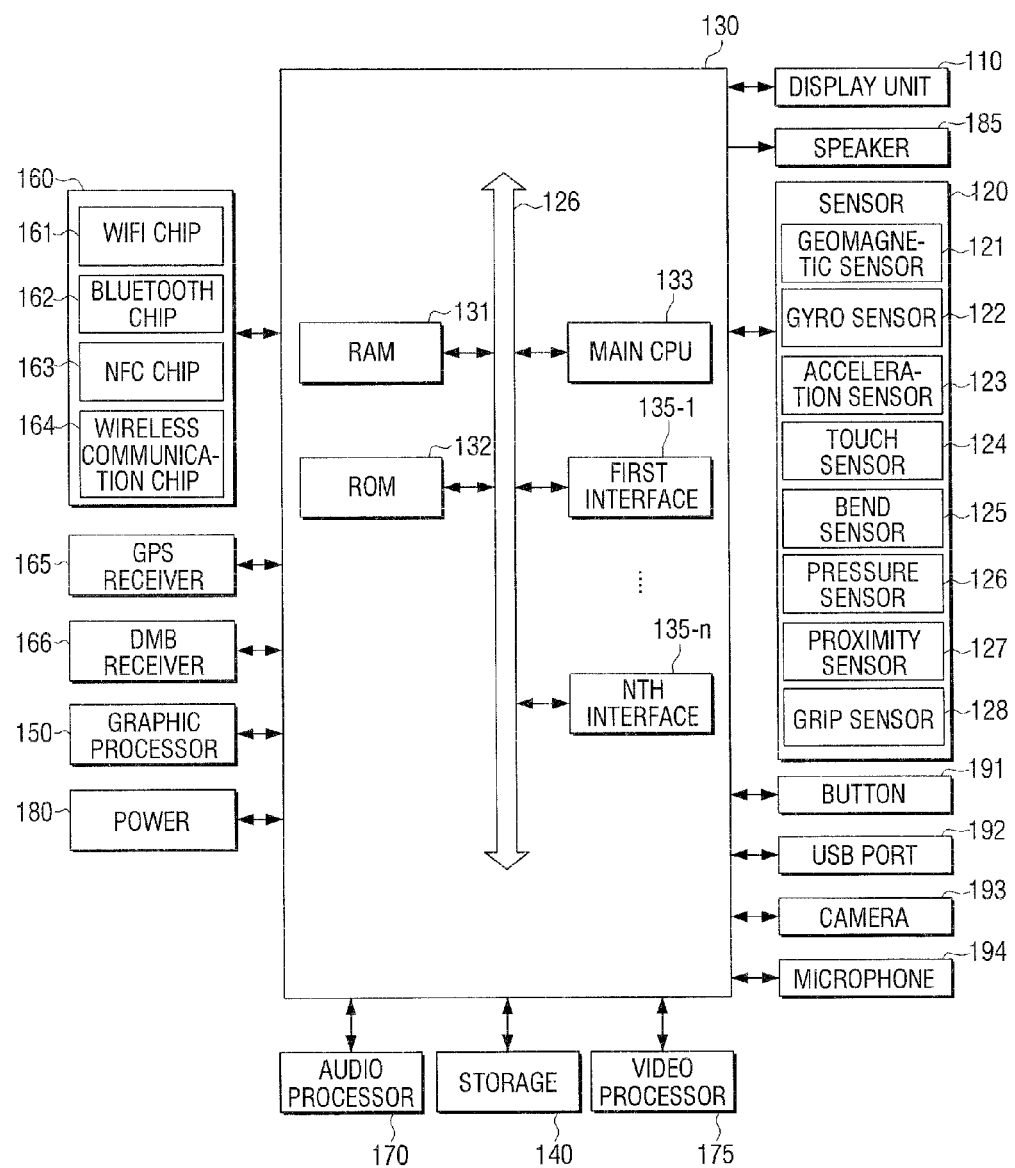
FIG. 18 is a block diagram for explaining an example of a detailed configuration of a flexible display apparatus for explaining operations in accordance with various embodiments of the present disclosure.

FIG. 18 is a block diagram for explaining an example of a detailed configuration of the flexible display apparatus for explaining operations according to various embodiments of the present disclosure.

Referring to FIG. 18, the flexible display apparatus 100 includes a display unit 110, a sensor 120, a controller 130, a storage 140, a graphic processor 150, a communicator 160, a GPS receiver 165, a DMB receiver 166, an audio processor 170, a video processor 175, power 180, a speaker 185, one or more buttons 191, a USB port 192, a camera 193, and a microphone 194. Of among the configurative elements illustrated in FIG. 1, explanation on those repeated in FIG. 17 will be omitted.

The sensor 120 includes a geomagnetic sensor 121, a gyro sensor 122, an acceleration sensor 123, a touch sensor 124, a bend sensor 125, a pressure sensor 126, a proximity sensor 127, and a grip sensor 128. The sensor 120 may sense various manipulations such as a touch, rotation, gradient, pressure, approach etc. regarding the flexible display apparatus 100 besides the aforementioned bending.

The geomagnetic sensor 121 is a sensor for sensing a rotation state and movement direction of the flexible display apparatus 100. The gyro sensor 122 is a sensor for sensing a rotating sense of the flexible display apparatus 100. Both the geomagnetic sensor 121 and the gyro sensor 122 may be provided, either one may sense the rotation state of the flexible display apparatus 100.

The acceleration sensor 123 is a sensor for sensing the inclined degree of the flexible display apparatus 100. Besides these, the acceleration sensor 123 may be used to detect bending characteristics such as the bending direction or bending area of the flexible display apparatus 100.

The touch sensor 124 may be embodied in an electrostatic or pressure sensitive type. The electrostatic type is a method of using the dielectric coated on the surface of the display unit 110 to sense fine electricity excited to the user's body when a portion of the user's body touches the surface of the display unit 110 and calculates the touch coordinate. The pressure sensitive type is a method where, when the user touches the screen, senses the current flowing as the upper and lower plates at the touched point contacts each other, and calculates the coordinates. As aforementioned, the touch sensor 114 may be embodied in various types.

The bend sensor 125 may be embodied in various types and numbers as aforementioned and may sense the bending state of the flexible display apparatus 100. Various examples of the configuration and operations of the bending sensor 125 were mentioned above, and thus repeated explanation is omitted.

The pressure sensor 126 senses the size of the pressure applied to the flexible display apparatus 100 when the user touches or makes a bending manipulation and provides the sensed size to the controller 130. The pressure sensor 126 may include a piezo film which is embedded inside the display unit 110 and outputs electric signals corresponding to the size of the pressure. In FIG. 18, the touch sensor 124 and the pressure sensor 126 are illustrated as separate embodiments, but when the touch sensor 124 is embodied in a pressure sensitive type, that pressure sensitive touch sensor may play the role as the pressure sensor 126 as well.

The proximity sensor 127 is a sensor for sensing an approaching motion without directly contacting the display surface. The proximity sensor 127 may form a high frequency wave magnetic field, and may be embodied in a high frequency wave oscillation type which senses the current induced by the magnetic field characteristics which change when an object approaches, a magnetic type using a magnet, and an electrostatic capacitance type which senses the electrostatic capacity which changes by an approach of an object.

The grip sensor 128 is a sensor arranged along the circumference or handle portion of the flexible display apparatus 100 separately from the pressure sensor 126, to sense the user's grip. The grip sensor 128 may be embodied in a pressure sensor or a touch sensor.

The controller 130 analyzes various sense signals sensed in the sensor 120, understands the user's intentions, and performs operations corresponding to such intentions. The controller 130 may perform various control operations according to various input methods such as a touch manipulation, motion input, voice input, and button input etc. besides bending. A touch manipulation may include a simple touch, tap, touch & hold, move, flick, drag & drop, pinch in, and pinch out etc.

For example, the controller 130 may execute an application stored in the storage 140 to configure its execution screen and display the configured screen, and may reproduce various contents stored in the storage 140. In addition, the controller 130 may perform communication with external devices through the communicator 160.

The communicator 160 is configured to perform communication with various types of external devices according to various types of communication methods.

For example, the communicator 160 may perform communication with an external server (not illustrated). The communicator 160 may transmit information (for example, screen size information) on the second screen generated based on the bending of the flexible display apparatus 100 to the external server according to a control of the controller 130, and receive screen data corresponding to the corresponding screen size information from the external server.

In addition, the controller 130 may receive contents from the external device according to the functions performed in the divided screen based on the bending input, or control the communicator 150 to transmit the contents to the external device. For example, the controller 130 may control the communicator 150 to transmit the contents to be shared with the counterpart during a video call.

The communicator 160 may include a WiFi chip 161, a Bluetooth chip 162, a Near Field Communication (NFC) chip 163, and a wireless communication chip 164.

Each of the WiFi chip 161, the Bluetooth chip 162, and the NFC chip 163 performs communication in the WiFi method, Bluetooth method, and NFC method. Of these, the NFC chip 163 refers to a chip operating in the NFC frequency which uses 13.56 MHz bandwidth among various Radio Frequency (RF)-ID frequency bandwidths such as 135 kHz, 13.56 MHz, 433 MHz, 860-960 MHz, 2.45 GHz etc. In the case of using a WiFi chip 161 or a Bluetooth chip 162, it is possible to first transceive various connection information such as SSID and session key etc., make communication connections, and then transceive various information using the same. The wireless communication chip 164 refers to a chip performing communication according to various communication standards such as IEEE, zigbee, 3rd Generation (3G), 3rd Generation Partnership Project (3GPP), and Long Term Evolution (LTE).

The GPS receiver 165 is a configurative element for receiving GPS signals from the Global Positioning System (GPS) satellite and calculating the current location of the flexible display apparatus 100.

The DMB receiver 166 is a configurative element for receiving and processing Digital Multimedia Broadcasting (DMB) signals.

The graphic processor 150 uses a calculator (not illustrated) and a renderer (not illustrated) to generate a bending interaction guide to be added to the object. The calculator calculates characteristic values such as the coordinate values, shape, size, color, etc. of where the bending interaction will be displayed. The renderer generates a graphic object based on the characteristics value calculated in the calculator. The bending interaction guide generated in the renderer is added to various icons on the screen displayed on the display unit 110 and is displayed. The bending interaction guide may be generated in such formats to include line guide images having various widths of lines, number of lines, shapes of lines, locations of lines, angles of lines, colors of lines, sizes of lines, and lengths of lines, and other various letters and symbols guides in accordance with the bending characteristics.

The power 180 is a configurative element supplying power to each configurative element of the flexible display apparatus 100. The power 180 may be embodied to include an anode, anode electrode, electrolysis, cathode electrode, cathode, and a covered portion covering the same. The power 180 is embodied in a secondary battery which is chargeable/dischargeable. The power 180 may be embodied in a flexible format so as to be bendable together with the flexible display apparatus 100. In this case, electrodes, electrolysis, covered portions, etc. may consist of material having flexible characteristics. Shapes and materials of the power 180 will be explained in more detail herein below.

The audio processor 170 is a configurative element for processing audio data. In the audio processor 170, various processing such as decoding, amplifying, noise filtering etc. may be performed regarding audio data.

The video processor 175 is a configurative element for processing video data. In the video processor 175, various video processing such as decoding, scaling, noise filter, frame rate conversion, resolution conversion, etc. may be performed regarding the video data.

The speaker 185 is a configurative element outputting not only various audio data processed in the audio processor 170 but also various alarm sounds and voice messages etc.

A button 191 may be embodied in various types of buttons such as a mechanical button, touch pad, and wheel etc.

formed on an area such as a front surface, side surface, back surface of the exterior body of the flexible display apparatus 100.

The USB port 192 may perform communication with various external devices having USG communication functions through USB cables.

The camera 193 is a configuration for photographing a still image or a video according to the user's control. A plurality of cameras may be provided, such as front surface cameras and rear surface cameras.

A microphone 194 is a configuration for receiving a user's voice or other sound and for converting the same into audio data. The controller 130 may use the user's voice input through the microphone 194 during the call, or convert the user's voice into audio data and store the result in the storage 140.

When a camera 193 and a microphone 194 are provided, the controller 130 may perform control operations according to the user motion recognized by the user voice input through the microphone 194 or by the camera 193. That is, the flexible display apparatus 100 may operate in a motion control mode or voice control mode. When operating in a motion control mode, the controller 130 activates the camera 193 to photograph the user, and tracks the user's motion change to perform control operations corresponding thereto. In the case of operating in the voice control mode, the controller 130 may analyze the user's voice input through the microphone and operate in the voice recognition mode which performs control operations according to the analyzed user's voice.

Besides the above, various external ports for connecting with various external terminals such as headsets, mouses, LANs, etc. may be further included.

The operations of the aforementioned controllers 130 may be made by the programs stored in the storage 140. In the storage 140, there may be stored an Operating System (O/S) for driving the flexible display apparatus 100, various applications, various data, bending information, and bending interaction guide information input or set during execution of the applications.

The controller 130 uses various programs stored in the storage 140 to control the overall operations of the flexible display apparatus 100. In addition, when an external display apparatus (not illustrated) is connected through an interface 160, the controller 130 may control the operations of that display apparatus 200 together as well.

The controller 130 includes a RAM 121, a ROM 122, a main CPU 133, 1st to nth interfaces 135-1~135-n, and a BUS 126.

The RAM 131, the ROM 132, the main CPU 133, the 1st to nth interfaces 135-1~135-n etc. may be connected to one another through the BUS 126.

The 1st to nth interfaces 135-1 to 135-n are connected with the aforementioned various configurative elements. One of the interfaces may be a network interface to be connected to the external device through the network.

The main CPU 133 accesses the storage 140, and performs booting using the O/S stored in the storage 140. In addition, the main CPU 133 performs various operations using various programs, contents, data, etc. stored in the storage 140.

In the ROM 132, command sets for system booting, etc. are stored. When a turn on command is input and power is supplied, the main CPU 133 copies the O/S stored in the storage 140 to the RAM 131 according to the command stored in the ROM 132, and executes the O/S to boot the system. When the booting is completed, the main CPU 133 copies various application programs stored in the storage 140 to the RAM 131, and executes the application programs copied to the RAM 131, to perform various operations.

FIG. 18 illustrates various configurative elements that may be included in the flexible display apparatus 100, but the flexible display apparatus 100 does not necessarily have to include all the aforementioned elements, and the flexible display apparatus 100 is not limited to include just the aforementioned configurative elements either. That is, of the aforementioned configurative elements, some may be omitted or added depending on the product type of the flexible display apparatus 100, and some may of course be replaced by other configurative elements.

Meanwhile, as aforementioned, the controller 130 may execute the program stored in the storage 140 and perform various operations.

Figure 19:
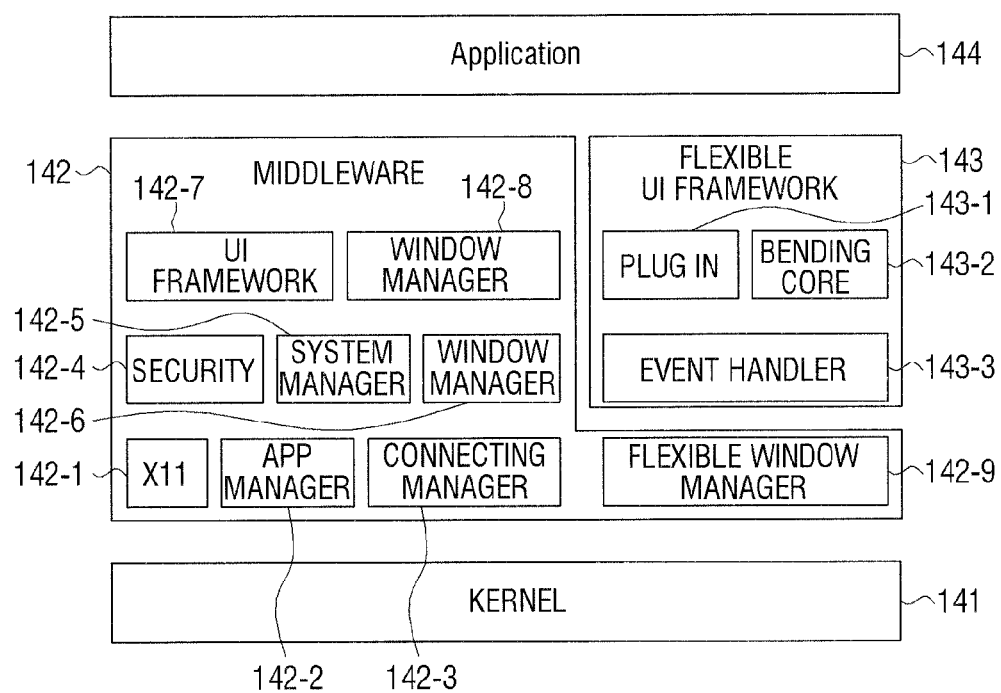
FIG. 19 is a view illustrating a software structure of a storage for supporting operations of a controller in accordance with various embodiments of the present disclosure.

FIG. 19 is a view for explaining a hierarchy of software according to an embodiment of the present disclosure.

Referring to FIG. 19, in the storage 140, a kernel 141, middleware 142, a flexible UI framework 143, and an application 144 are stored.

The kernel 141 plays a role of a passage for delivering sensing signals of various sensors included in the sensor 120 to the middleware 142 or the flexible UI framework 143.

The middleware 142 includes various software modules controlling operations of the flexible display apparatus 100. Referring to FIG. 19, the middleware 142 includes an X11 module 142-1, an APP manager 142-2, a connecting manager 142-3, a security module 142-4, a system manager 142-5, a multimedia framework 142-6, a UI framework 142-7, a window manager 142-8, and a flexible window manager 142-9.

The X11 module 142-1 is a module configured to receive various events from various hardware provided in the flexible display apparatus 100. Herein, an event may be set in various ways to include not only an event where a touch, bending or other user manipulation is sensed, but also an event where a system alarm occurs, and an event where a particular program is executed or ended etc.

The APP manager 142-2 is a module configured to manage the state of execution of various applications installed in the storage 140. When an event where an application execution command is input from the X11 module 142-2 is sensed, the APP manager 142-2 calls and executes the application corresponding to the event.

The connecting manager 142-3 is a module for supporting a wired or wireless network connection. The connecting manager 142-3 may include various modules such as a DNET module and UPnP module etc.

The security module 142-4 is a module for supporting certification, permission, secure storage, etc. regarding hardware etc.

The system manager 142-5 monitors the state of each configurative element within the flexible display apparatus 100, and provides the result of the monitoring to other modules. For example, in a case where there is not enough battery residual quantity, or an error occurs, when an incident occurs such as when a communication is disconnected, the system manager 142-5 provides the monitoring result to the UI framework 142-7 to output an alarm message or alarm sound.

The multimedia framework 142-6 is a module for reproducing multimedia contents stored in the flexible display apparatus 100 or provided from external source. The multimedia framework 142-6 may include a player module, a camcorder module, a sound processing module, etc. Accordingly, it is possible to reproduce various multimedia contents and generate screen and sound to perform reproducing operations.

The UI framework 142-7 is a module for providing various UIs. The UI framework 142-7 may include an image compositor module for configuring various image objects, a coordinate compositor for calculating the coordinates where an image object is to be displayed, a rendering module for rendering the configured image object on the calculated coordinates, and a 2D/3D UI toolkit providing a tool for configuring a 2D or 3D type UI.

The window manager 142-8 may sense a touch event sensed by a touch sensor, or an input event input by other input means. When such an event is sensed, the window managing module 147-1 delivers the event to the UI framework 142-7, so that operations corresponding to the event may be performed.

The flexible window manager 142-9 is a module for managing a system according to a bending when a bending is sensed. When it is sensed that a bending event has occurred, the flexible window manager 142-9 transmits the bending event to the flexible UI framework 143.

The flexible UI framework 143 includes a plug in module 143-1, a bending core 143-2, and an event handler module 143-3. The plug in module 143-1 plays a role of connecting and loading the flexible UI framework 143 to the middleware 142. In an embodiment, the kernel 141, the middleware 142, the application 144, etc. may use the software of existing electronic devices, and use the plug in module 143-1 to connect the flexible UI framework 143. Accordingly, it is possible to additionally provide control operations according the bending while maintaining compatibility with the existing system.

The event handler 143-3 is a module for controlling operations according to the bending when a bending has occurred. The event hander 143-3 receives various bending events from the flexible window manager 142-9 through the plug in module 143-1 and classifies the event according priority per event. Herein, a bending event refers to an event where a particular type of bending is sensed.

The bending core 143-2 performs cueing of the bending events classified by the event hander 143-3, and matches the bending event to the corresponding program (application, widget etc.). Accordingly, the bending core 143-2 executes the program matched to the bending event.

Meanwhile, the bending core 143-2 may transmit a rendering event signal for additionally rendering the bending interaction guide corresponding to each bending shape on an object to the UI framework 142-7 through the plug-in module 143-1. Accordingly, on each object of the screen, a bending interaction guide may be displayed in an overlapping manner. In addition, when a particular bending occurred and thus a screen must be converted, the bending core 143-2 may deliver the rendering event signal for rendering the screen to be converted to the UI framework 142-7 through the plug in module 143-1.

Besides the above, the application module 144 includes various applications for supporting various functions. For example, the application module 144 may include a program module for providing various services such as a navigation program module, a game module, an e-book module, a calendar module, an alarm management module, etc.

Besides the above, in the storage 140, there may be provided various programs such as a sensing module for analyzing signals sensed in various sensors, a messaging module such as a messenger program, a Short Message Service (SMS) a Multimedia Message Service (MMS) program, a Call Info Aggregator program module, a VoIP module, a web browser module, etc.

As such, the middleware 142 for controlling the system operations according to other user manipulations besides bending and the framework 143 for controlling the system operation may be designed to be connected to each other. Accordingly, it may be compatible to the software configuration of the existing system. However, it need not be programmed in such a software structure, but may be designed to manage the general user manipulations and bending operations in a single framework.

When the flexible display apparatus 100 is turned on or the lock is released, a main screen is displayed. Various icons are displayed on the main screen. The main CPU 133 uses the flexible UI framework 143 and UI framework 142-7 to provide various basic data for adjusting the display state of the bending interaction guide to the graphic processor 130. The basic data may be various data such as the shape, location, size, color, and display duration etc. of the bending interaction guide. Accordingly, as aforementioned, the graphic processor 150 generates a bending interaction guide, adds the bending interaction guide on the object of the display unit 110 and displays the result.

Various program modules illustrated in FIG. 19 may of course be omitted, or changed, or added depending on the type and characteristics of the flexible display apparatus 100.

Meanwhile, in the aforementioned various embodiments, the flexible display apparatus 100 is a flat panel, but it may be embodied in various shapes. For example, the flexible display apparatus 100 may be embedded inside the main body made of inflexible material.

Figure 20:
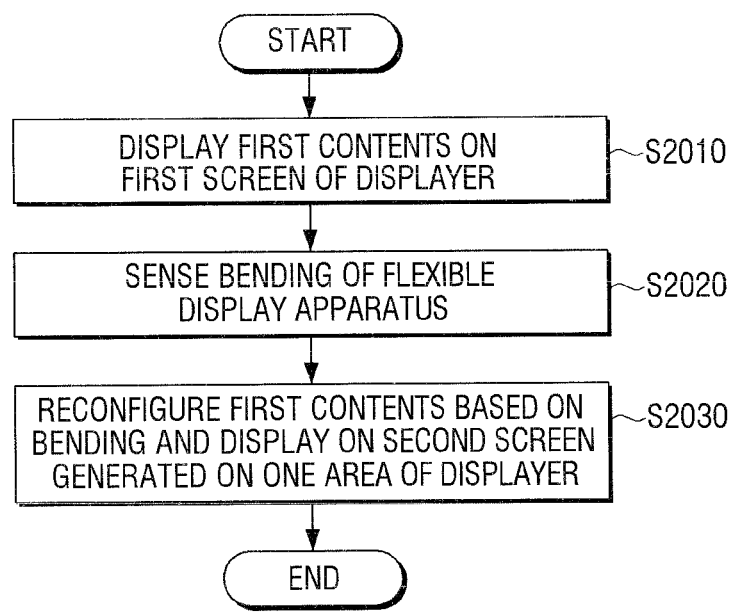
FIG. 20 is a view for illustrating a display method of a flexible display apparatus in accordance with an embodiment of the present disclosure.

FIG. 20 is a view for explaining a display method of a flexible display apparatus according to an embodiment of the present disclosure.

Referring to the display method of the flexible display apparatus illustrated in FIG. 20, the first contents is displayed on the first screen of the display unit at operation S2010. Herein, the first screen may be the entire screen of the display unit.

Herein, a bending of the flexible display apparatus is sensed at operation S2020.

The first contents are reconfigured on the second screen generated on one area of the display unit based on the bending sensed at operation S2020 in operation S2030.

In addition, at operation S2030 of reconfiguring and displaying the first contents, with the first shape kept for or more than a certain period of time, the first contents may be reconfigured and displayed on the second screen generated on one area of the display unit.

In addition, at operation S2030 where the second screen is generated in different shapes according to the location where the bending occurred and the first contents is reconfigured and displayed, the contents may be reconfigured in different shapes according to the shape of the second screen.

In addition, information related to the first contents may be displayed on the third screen generated on another area of the display unit that is, the remaining area other than the one area where the second screen is generated, based on the bending.

In addition, it is possible to detect the user's eyeline direction, and change the display perspective according to the detected user's eyeline direction and the bending angle of the bending input. Next, it is possible to change at least one of the first contents displayed on the first screen and the information related to the first contents to correspond to the display perspective and display the result on the second screen and the third screen.

Meanwhile, the information related to the first contents may include at least one of a first contents list including second contents of the same level as the first contents, a second contents list including a superior category of the first contents, and information for executing functions related to the first contents.

In addition, when the second contents belonging to the contents list is selected and a bending state is released, the second contents may be displayed on the entire screen of the display unit.

In addition, when the second contents belonging to the contents list is selected, and the bending state is released, the second contents may be displayed on the entire screen of the display unit.

In addition, when a flick manipulation is input at a state where the first contents is displayed on the second screen and the second contents is displayed on the third screen, it is possible to display the second contents on the second screen.

In addition, it is possible to transmit the information on the second screen generated based on the bending to the server. In this case, at operation S2030 of reconfiguring and displaying the first contents, it is possible to receive the reconfigured first contents corresponding to the second screen from the server and display the result.

In addition, the flexible display apparatus 100 may perform video call with a counterpart terminal. In this case, the flexible display apparatus 100 may display a video call image on the second screen generated on one area of the display unit based on the bending, and display an object for sharing contents with the video call counterpart on the third screen generated on another area of the display unit.

<A Display Method According to Various Embodiments of the Present Disclosure>

Figure 21A:
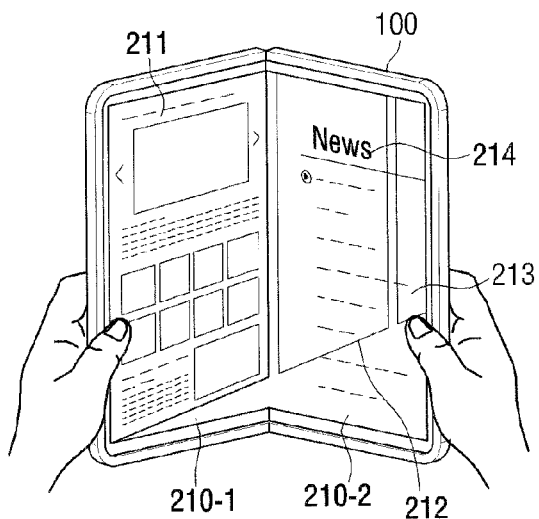
FIGS. 21A, 21B, 21C, 22, 23, 24, 25A, 25B, 26, 27A, 27B, 27C, 27D, 28, and 29 are views for explaining a display method in accordance with an embodiment of the present disclosure.
Figure 21B:
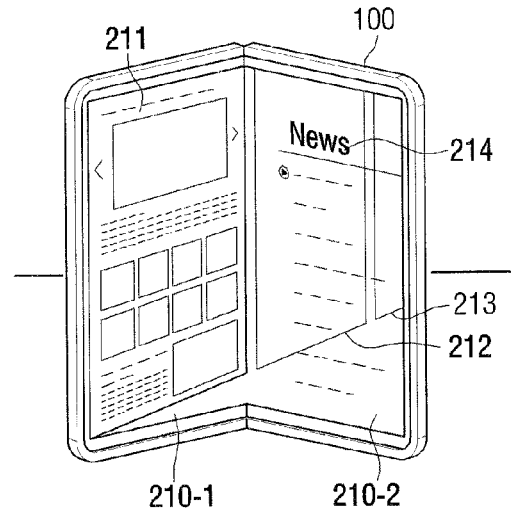
Figure 21C:
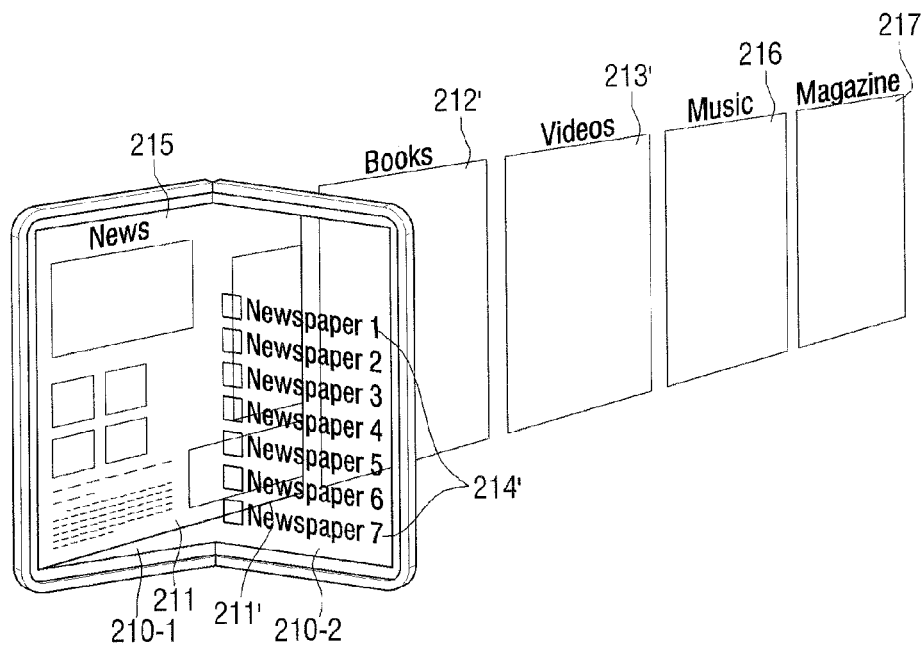

FIGS. 21A to 21C are views for explaining a display method according to an embodiment of the present disclosure.

Referring to FIG. 21A, when the flexible display apparatus 100 is bent for or more than a certain angle, on a second screen 210-1 generated based on the bending, first contents 211 displayed before the bending input was performed is reconfigured and displayed, and on a third screen 210-2, a contents list 214 of the contents belonging to the same category as the first contents 211 displayed on the second screen 210-1 may be displayed. In this case, the first contents 211, which were displayed on the entire screen before the bending was performed, that is on the first screen, may have their layout changed to be suitable to the size of the second screen 210-1 and be displayed.

In addition, as a background of the third screen 210-2, an image 212, 213 corresponding to another category of the same level as the superior category to which the first contents 211 displayed on the second screen 210-1 belong to may be displayed. In this case, the images 212, 213 displayed as the background of the third screen 210-2 may be displayed in a format applying a perspective having the same vanishing point as the first contents 211 displayed on the second screen 210-1.

Meanwhile, it is illustrated in FIG. 21A that the corresponding operations are performed with only the bending of the flexible display apparatus 100, but it can also be embodied such that the corresponding operations are performed when additional manipulations are sensed as illustrated in FIG. 21B.

For example, it may also be embodied to provide a display screen as illustrated in FIG. 21A when a corner surface each belonging to a screen 210-1, 210-2 generated based on the bending as illustrated in FIG. 21B is arranged to touch on the support surface.

FIG. 21C is a view for explaining the shape of display illustrated in FIG. 21B in further detail.

Referring to FIG. 21C, the first contents 211 displayed on the second screen 210-1 may be connected to the third screen 210-2 according to the bending angle and be displayed. Accordingly, a portion 211' of the first contents 211 may be displayed on the third screen 210-2. For example, if the first contents 211 are displayed on the second screen 210-1 after the bending input is initiated and reached a certain first bending angle, the portion 211' of the first contents 211 may be displayed on the third screen 210-2 at the second bending angle before reaching the first bending angle as illustrated.

In addition, on the third screen 210-2, categories (for example, Books category 212', Videos category 213') in the same level as the category (for example, News category 215) where the first contents 211 displayed on the third screen 210-1 belongs to may be displayed. In addition, a Music category 216, a Magazine category 217, etc. systematically arranged after the Videos category 213' may be newly displayed on the third screen 210-2. For example, by the manipulation of flicking or sweeping, the News category 215 displayed on the second screen 210-1 to the left side, the News category 215 disappears to the outside of the screen, the Books category 212' arranged after the News category 215 is moved to the third screen 210-1 and is displayed, and the Videos category 213' which did not show on the screen appears on the third screen 210-2. In this case, the categories displayed on the third screen 210-2 are displayed to have perspectives having one vanishing point as illustrated.

In addition, the Music category 216, Magazine category 217 etc. which are arranged systematically after the Videos category 213' may be newly displayed on the third screen 210-2 by the user's manipulation. For example, by the manipulation of flicking or sweeping the News category 215 displayed on the second screen 210-1 to the left, the News category 215 may disappear out from the screen, and the Books category 212' arranged after the News category 215 may be moved on the third screen 210-1 and displayed, and the Videos category 213' which did not show on the screen appears on the third screen 210-2. In this case, the categories displayed on the third screen 210-2 may be displayed to have perspectives having one vanishing point as illustrated.

In addition, on the third screen 210-2, a contents list 214' including other contents belonging to the News category 215 where the first contents 211 displayed on the second screen 210-1 belong to may be displayed. In this case, the contents list 214' may be overlapped by the categories 212', 213', 215, 216, 217 displayed on the third screen 2102 and be displayed.

Figure 22:
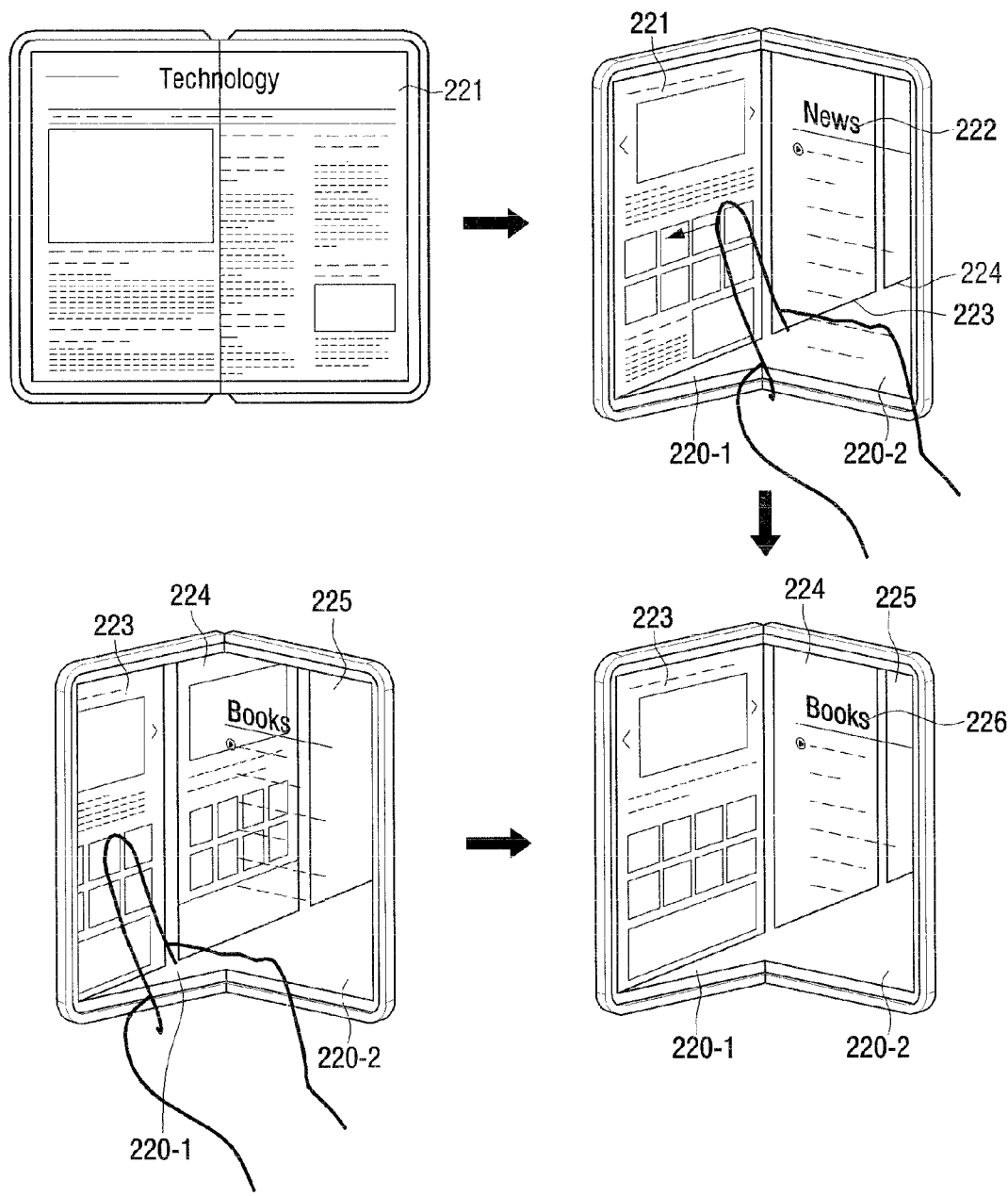

FIG. 22 is a view for explaining a display method according to an embodiment of the present disclosure.

Referring to FIG. 22, with the first contents 221 displayed on the entire screen of the flexible display apparatus 100, when the flexible display apparatus 100 is bent by or above a certain angle, the first contents 221 may be displayed on the left screen 220-1 of the plurality of screens generated by the bending, and a plurality of categories 223, 224 of the same level as the category including the first category 221 may be sequentially displayed on the right screen 220-2 as illustrated in FIG. 21, and the contents list 222 including other contents belonging to the same category as the first contents 221 may be displayed together.

According to the user's manipulation of sweeping the first contents 221 displayed on the left screen 220-1 to the left, the images 221, 223, 224 corresponding to each category may be slided and moved to the left. Accordingly, the contents displayed on the end of the left screen 220-1 disappears outside from the screen, and a new image 225 having a contents list 226 from the end of the right screen 220-2 appears on the screen and is displayed.

In this case, when an image displayed on the left screen is changed, the second contents list 225 corresponding to the changed image is displayed on the right screen 220-2.

Meanwhile, as illustrated in the fourth view, there may be provided a visual effect where, as the category image 223 is moved to the left, the contents list 224 corresponding to the category image 223 is moved to the left and disappears.

Figure 23:
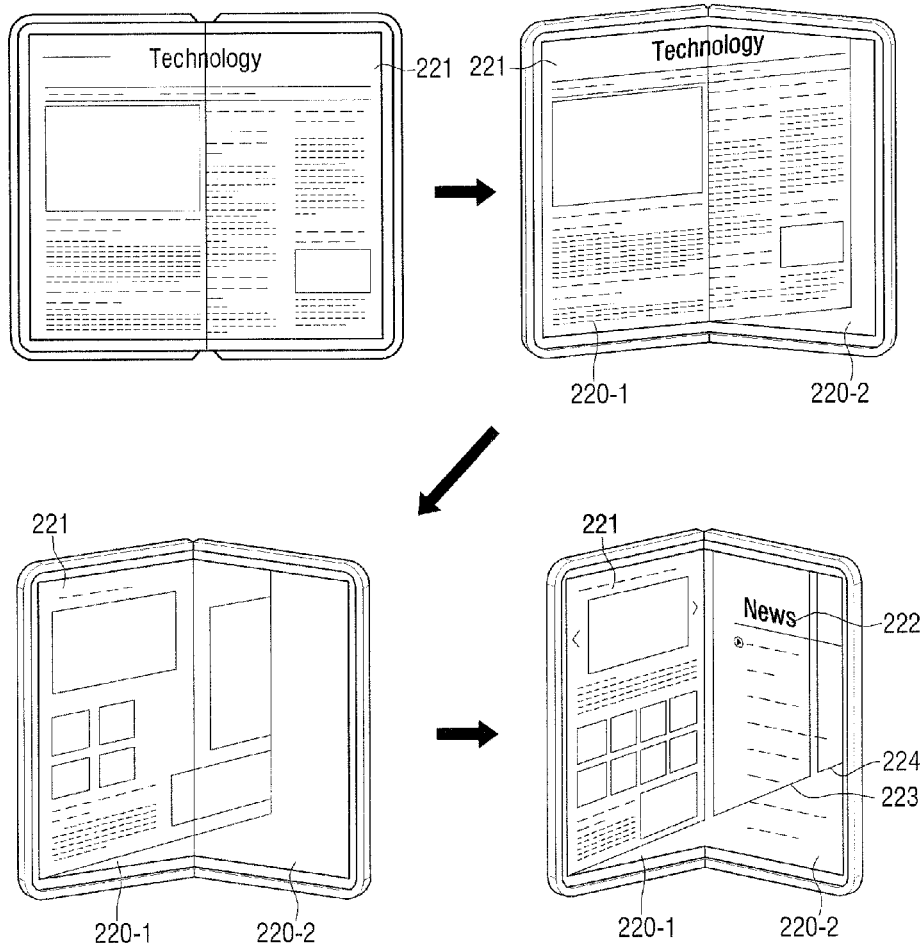

FIG. 23 is a view for explaining a process of change from a state illustrated in the first view of FIG. 22 to a state illustrated in the second view according to an embodiment of the present disclosure.

Referring to FIG. 23, with the first contents 221 displayed on the entire screen of the flexible display apparatus 100, when the bending angle according to the bending input regarding the flexible display apparatus 100 gradually increases, the first contents displayed on the screen may be displayed on the left screen 220-1 while its size gradually decreases. In this case, regarding the display format of the first contents 221, on the right screen 220-2, a particular contents area allocated to the corresponding screen may be displayed in a 3D format.

When the flexible display apparatus 100 is bent by or above a certain angle, the first contents 221 may be displayed on the left screen 220-1, and the aforementioned content list 222 and category image 223 etc. may be displayed on the right screen 220-2.

Figure 24:
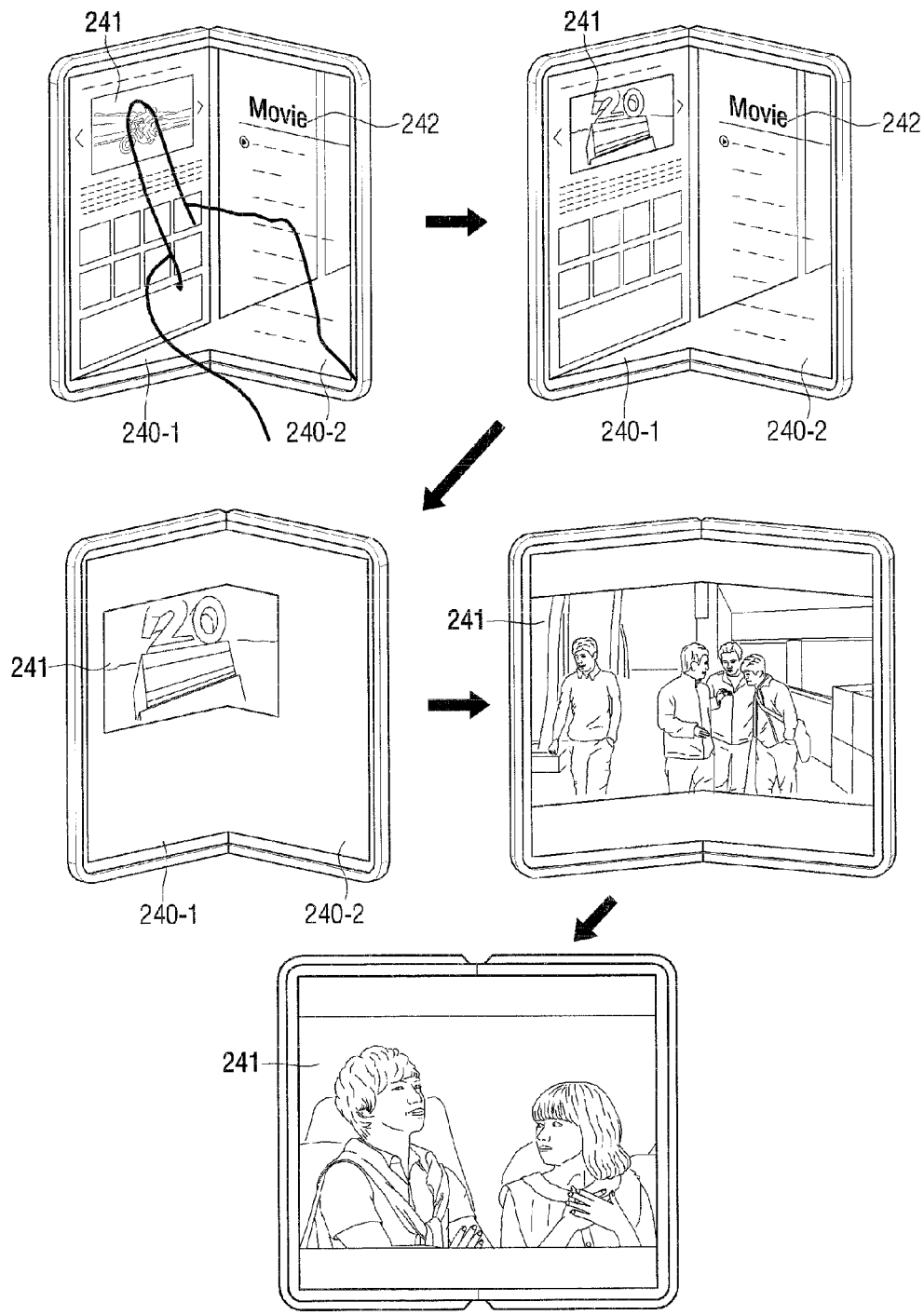

FIG. 24 is a view for explaining a display method according to other embodiments of the present disclosure.

Referring to FIG. 24, with the flexible display apparatus 100 bent by or above a certain angle, a contents provision screen including second contents 241 is displayed on a left screen 240-1 of the plurality of screens generated by the bending.

In addition, on the right screen 240-2, the contents list 242 including the contents belonging to the same category as the second contents 241 displayed on the left screen 240-1 is displayed.

When the second contents 241 displayed on the left screen 240-1 are selected, the selected contents 241 are reproduced on the screen, and as the extent of bending of the flexible display apparatus 100 gets slower, the size of the reproducing screen increases.

When the flexible display apparatus 100 becomes flat as illustrated in the last view, the size of the contents reproducing screen fills the entire screen.

Figure 25A:
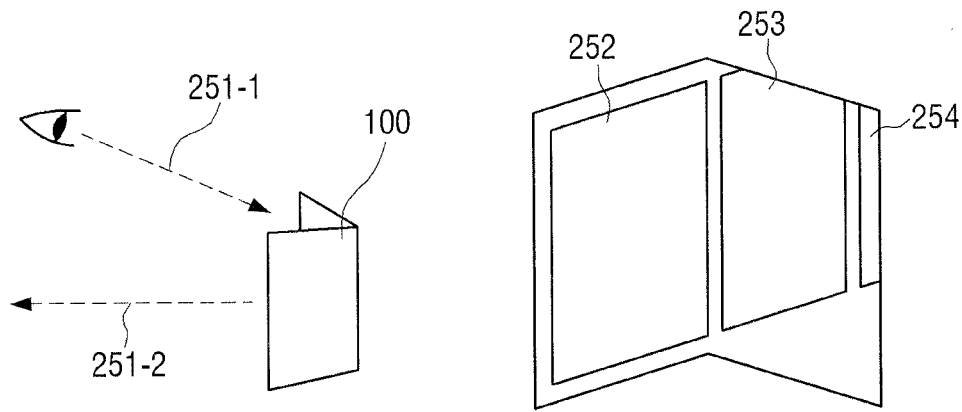
Figure 25B:
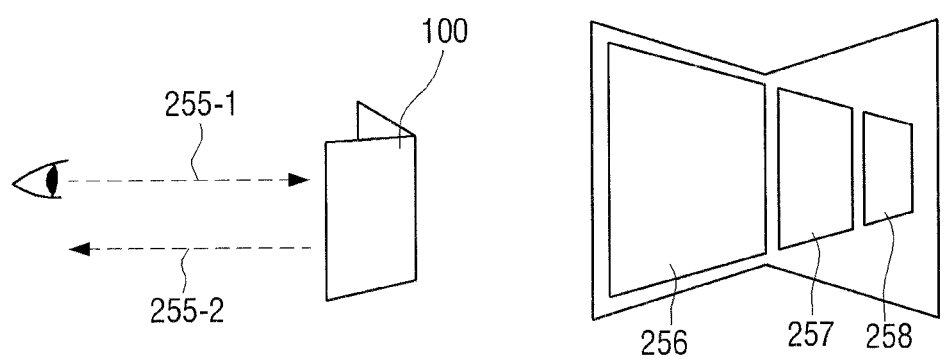

FIGS. 25A and 25B are views for explaining a display method according to another embodiment of the present disclosure.

Referring to FIG. 25A and FIG. 25B, it is possible to change the display format considering the user's eyeline direction 251-1 and the display direction 251-2.

More specifically, as illustrated in FIG. 25A, when the user's eyeline direction 251-1 looking at the display is a direction of looking down from the upper side of the flexible display apparatus 100 to the display screen, and the display direction 251-2 is in the front direction, it is possible to display such that the image 252 displayed on the left screen and the image 253, 254 displayed on the right from the user's eyeline direction 251-1 are naturally connected to each other.

In addition, as illustrated in FIG. 25B, when the user's eyeline direction 255-1 looking at the display is a direction of looking at the display screen from the front direction of the display apparatus 100 and the display direction 255-2 is the front direction that is identical to the user's eyeline direction 255-1, it is possible to display such that the image 256 displayed on the left screen and the image 257, 258 displayed on the right from the user's eyeline direction 255-1 are naturally connected to each other.

FIGS. 26 and 27A to 27D are views for explaining a display method according to another embodiment of the present disclosure.

Figure 26:
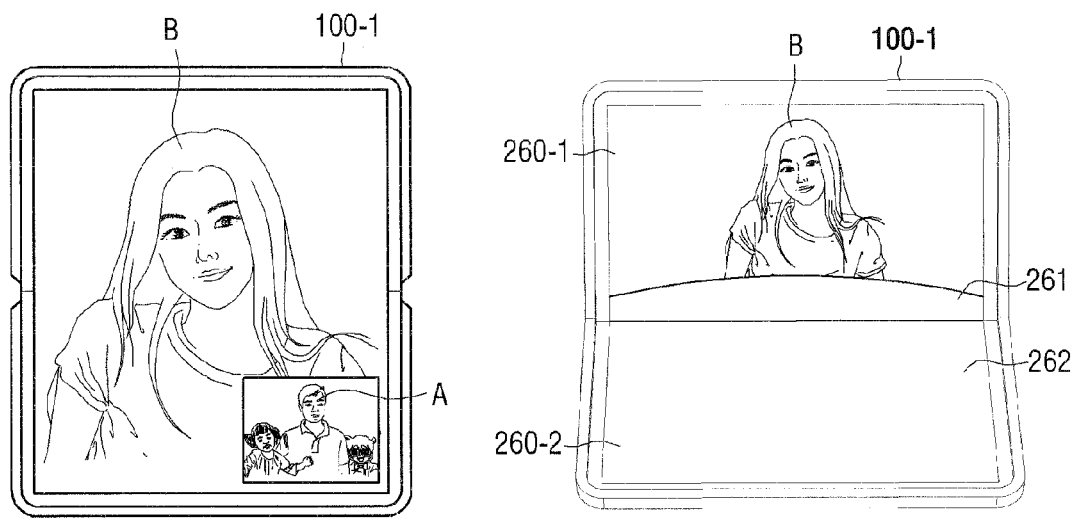

Referring to FIG. 26, when performing a video call with a user B at the flexible display apparatus 100-1 of the user A, with the flexible display apparatus 100-1 of the user A bent by or above a certain angle, a video call image of user B who is the video call counterpart is displayed on the first screen 260-1 of the screen divided based on the bending line, and a contents sharing area 261 for displaying objects 263 to 266 for sharing contents with user B may be provided on the second screen 260-2. In addition, on the first screen 260-1, a contents transmitting area 262 for displaying the contents that user A transmitted to user B may be provided on the first screen 260-1.

Referring to FIGS. 27A to 27D, by the user manipulation of selecting contents 263 of the objects 263-266 for sharing contents with user B displayed on the contents sharing area 261 provided on the second screen 260-2 and moving the selected contents to the contents transmitting area 262 provided on the first screen 260-1, it is possible to transmit the selected contents 263 to the flexible display terminal 100-1 of user B. Herein, the user manipulation may be a touch & flick or a touch & drag manipulation of touching the contents 263 and flicking or dragging the contents transmitting area 261.

The last drawing of FIGS. 27A to 27D represents the flexible display terminal 100-2 of user B which received the contents 263 transmitted from the flexible display apparatus 100-1 of user A.

As illustrated, with the flexible display apparatus 100-2 of user B bent by or above a certain angle, on the first screen 260-3 of the plurality of screens generated by the bending, an image of user A who is the video call counterpart may be displayed, and on the second screen 260-4, the contents 263 received from the flexible display terminal 100-1 of user A may be displayed.

Accordingly, the user is able to receive contents from the video call counterpart's terminal during the video call real time.

Figures 27A, 27B:
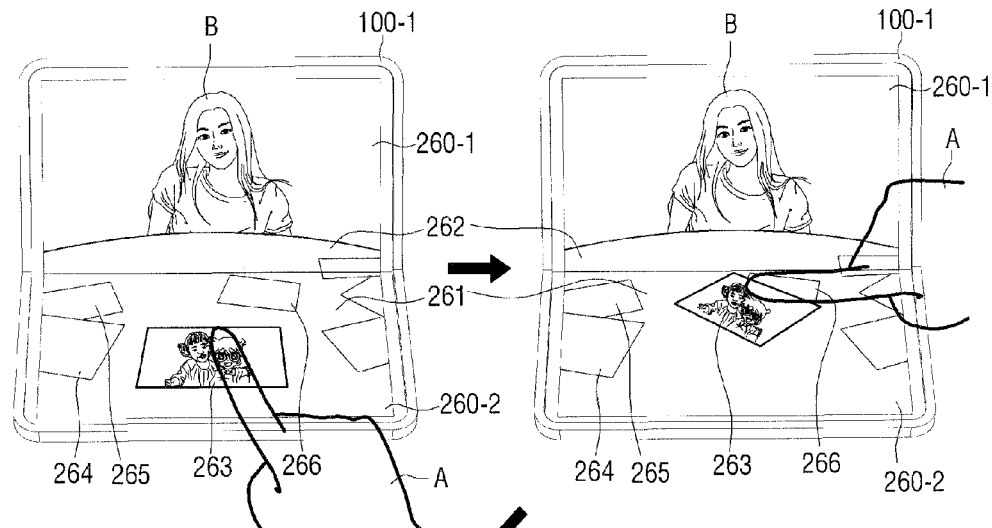
Figures 27C, 27D:
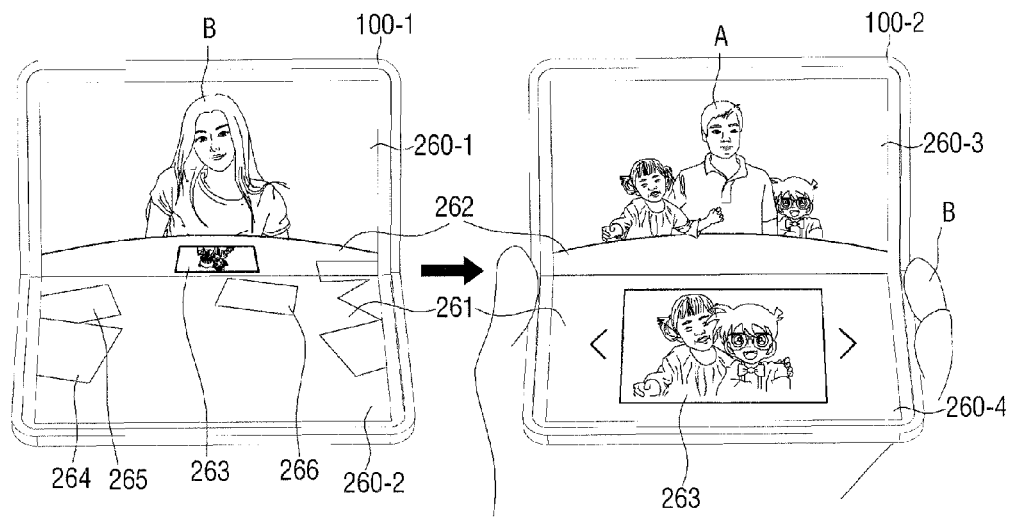

In FIGS. 26 to 27D, it is explained that the corresponding operations are performed by only a bending input regarding the flexible display apparatus 100, it may also be embodied to perform corresponding operations when additional manipulations besides the bending input are sensed. For example, it may also be embodied to provide the display screen explained in FIGS. 26 to 27D when a corner surface where each of the plurality of screens 210-1, 210-2 generated by the bending is arranged to contact the support surface.

Figure 28:
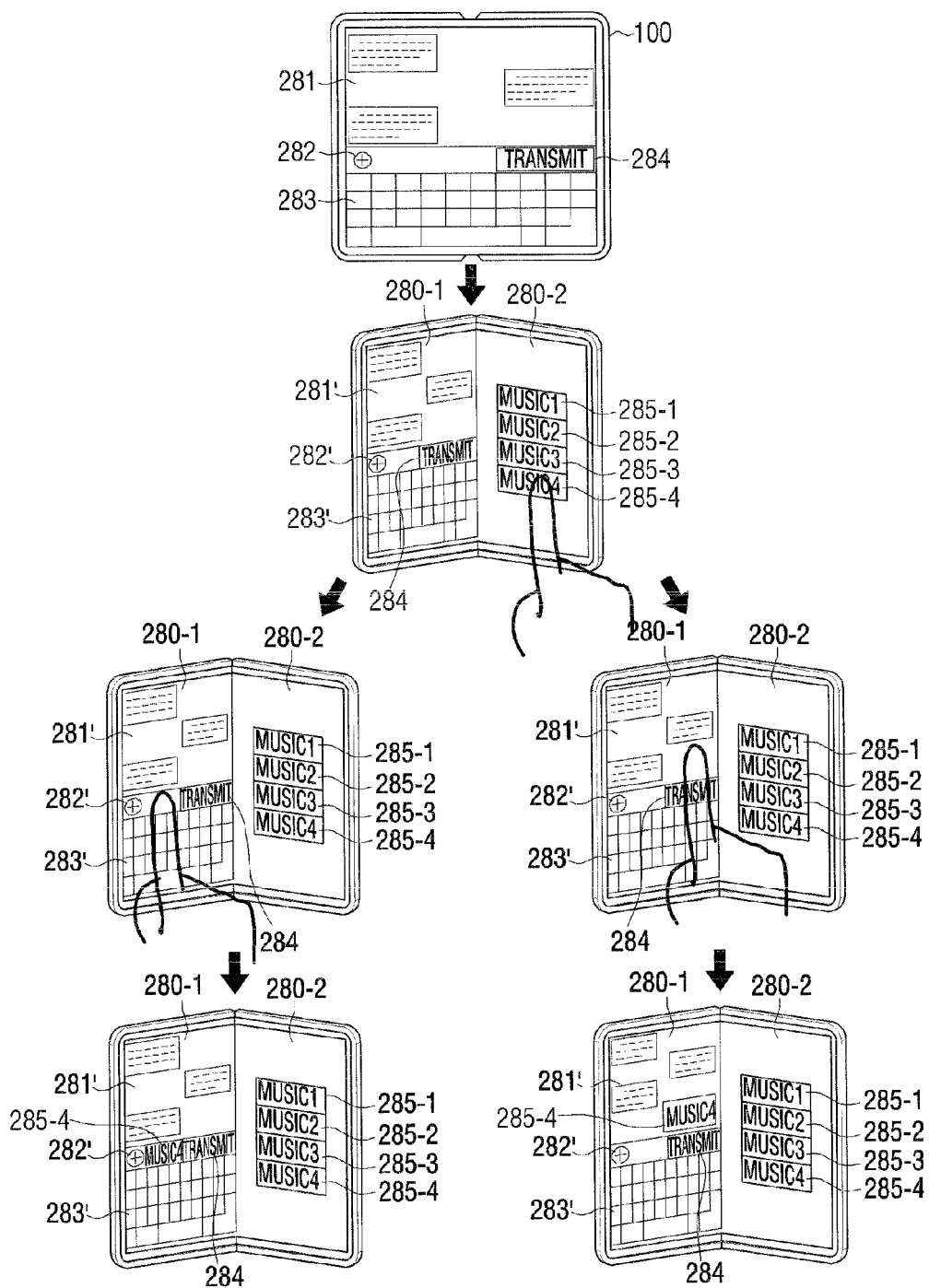

FIG. 28 is a view for explaining a display method according to another embodiment of the present disclosure.

Referring to FIG. 28, a case is assumed where a messenger application is driving on the screen of the flexible display apparatus 100.

In this case, as illustrated, a chatting screen 281 where messages sent and received on the screen are displayed, a message input screen 282 where a message being input is displayed, and a keyboard screen 283 for message input may be displayed. In this case, on the message input screen 282, a transmitting button 284 for transmitting an input message to the counterpart may be provided.

Next, when there is a bending input regarding the flexible display apparatus 100, a chatting screen 281', a message input screen 282', and a keyboard screen 283' which were displayed on the entire screen may be scaled to fit the size of the second screen 280-1 and be displayed on the second screen 280-1 of the plurality of screens generated by bending.

In addition, on the third screen 280-2, a contents list including a plurality of contents 285-1, 285-2, 285-3, and 285-4 may be displayed. When a user manipulation of selecting contents 285-4 of the contents list displayed on the third screen 280-2 and moving the selected contents 285-4 to the message input screen 282' provided on the second screen 280-1 is input, the corresponding contents 285-4 may be attached to the message input screen 282'. In this case, the user may transmit the corresponding contents 285-4 to the counterpart through the transmission button 284.

In addition, when a user manipulation of selecting contents 285-4 of the contents list displayed on the third screen 280-2 and moving the selected contents 285-4 to the chatting screen 281' provided on the second screen 280-1, the corresponding contents 285-4 may be displayed on the chatting screen 281'. That is, the corresponding contents 285-4 may be directly transmitted to the counterpart.

Figure 29:
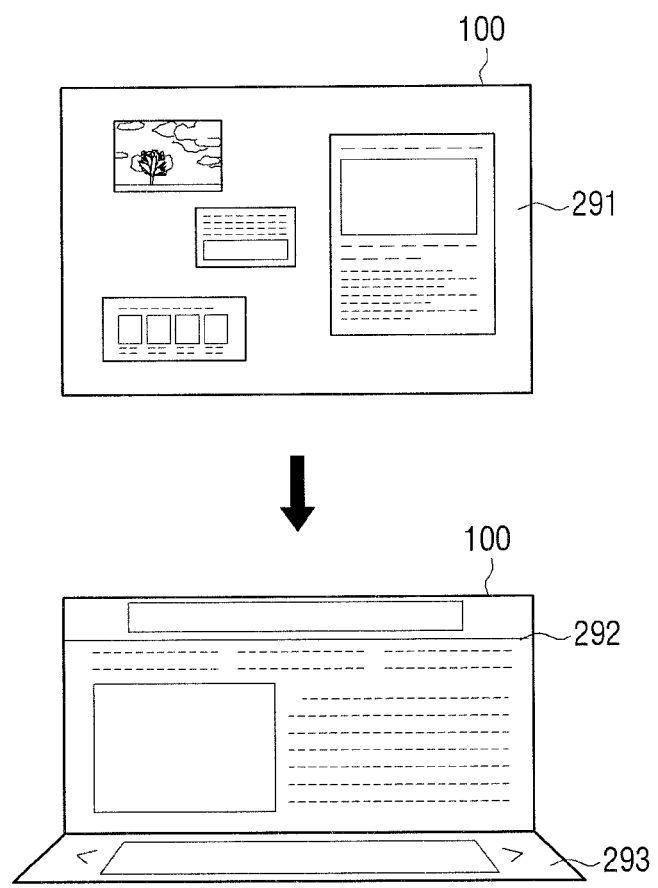

FIG. 29 is a view for explaining a display method according to another embodiment of the present disclosure.

Referring to FIG. 29, after there has been a bending input with particular contents displayed on the screen 291 of the flexible display apparatus 100, one of the plurality of screens generated by the bending may be arranged to contact the support surface.

In this case, on one screen 292 of the divided screens, a particular contents which was displayed on the original screen may be scaled to fit the size of the divided screen and be displayed, and on one screen 293 contacting the support surface, a control screen for controlling a particular contents displayed on the screen may be displayed. For example, it may be embodied in a touch pad shape.

In addition, although not illustrated in the views, when a plurality of control modes are needed, for example, when a touch pad screen and a keyboard screen must be provided together, it is possible to divide one screen contacting the support surface and provide a plurality of control screens to each divided screen.

Figure 30:
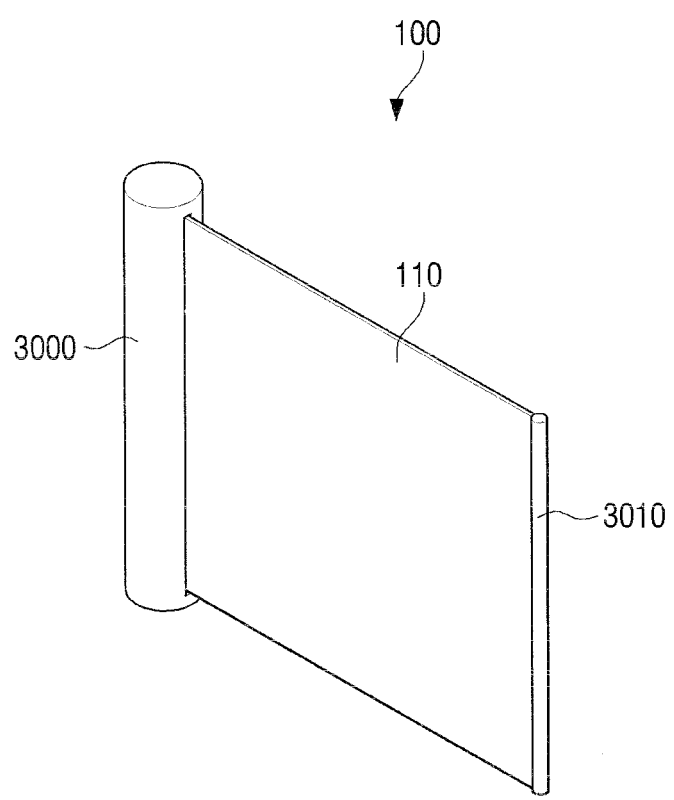
FIG. 30 is a view illustrating a flexible display apparatus configured to have a shape where a power may be attached/detached.

FIG. 30 is a view illustrating a shape of an exterior of a flexible display apparatus according to an embodiment of the present disclosure.

Referring to FIG. 30, the flexible display apparatus 100 may include a main body 3000, display unit 110, and grip 3010.

The main body 3000 is a type of case for containing the display unit 110. When the flexible display apparatus 100 includes various configurative elements as in FIG. 18, the configurative elements other than the display unit 110 and some sensors may be mounted on the main body 3000.

The main body 3000 includes a rotation roller (not illustrated) configured to roll the display unit 110. Accordingly, when not in use, the display unit 110 may be rolled around the rotation roller and be embedded in the main body 3000. When the user grips and draws the grip 3010, the rolling is released as the rotation roller rotates to the rolling opposite direction, and the display unit 110 comes outside the main body 3000. In the rotation roller, a stopper may be provided. Accordingly, when the user draws the grip 3010 for or more than a certain distance, the rotation of the rotation roller may be stopped by the stopper, and the display unit 110 may be fixated.

The user may use the display unit 110 externally exposed to execute various functions. Meanwhile, when the user presses the button for releasing the stopper, the rotation roller may rotate to a reverse direction as the stopper is released, and as a result, the display unit 110 may be rolled inside the main body 3000. The stopper may have a switch shape of stopping operations of a gear for rotating the rotation roller. Regarding the rotation roller and the stopper, the structure used in a general rolling structure may be used, and thus specific illustration and explanation are omitted.

Meanwhile, the main body 3000 includes power 180. The power 180 may be embodied in various formats such as a battery connector where a disposal one time use battery is mounted, a second battery which the user may charge for a plurality of times, and a solar cell performing generation using solar energy. In a case where the power is embodied in a second battery, the user may connect the main body 3000 and the external power in a wire and charge the power 180.

FIG. 30 illustrates a main body 3000 of a cylindrical structure, but the main body may be embodied in various shapes such as a square or other polygons. In addition, the display unit 110 may also be embodied in other various formats not only such that it is embedded in the main body 3000 and can be drawn externally and exposed, FIG. 31 is a view illustrating a flexible display apparatus where power may be detached/attached therefrom/thereto according to an embodiment of the present disclosure.

Figure 31:
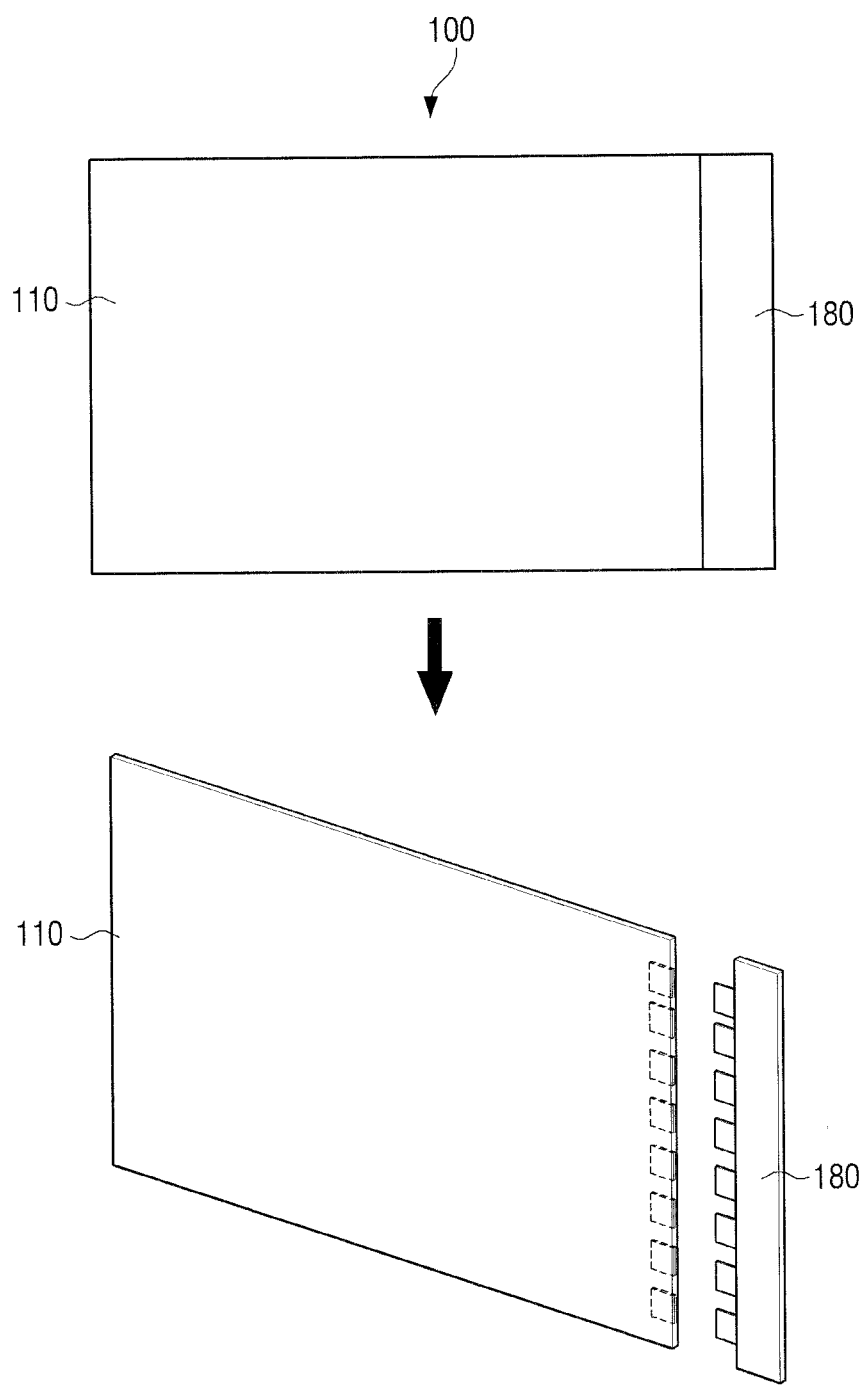
FIG. 31 is a view illustrating a flexible display apparatus where a power may be detached/attached therefrom/thereto according to an embodiment of the present disclosure.

Referring to FIG. 31, the power 180 may be provided on one edge of the flexible display apparatus 100 and be detached/attached therefrom/thereto.

The power 180 may be made of a flexible material, and be bent together with the display unit 110. More specifically, the power 180 may include a cathode, cathode electrode, electrolyte, anode electrode, anode, and a covered part covering the same.

For example, the anode or cathode or both may be embodied using an alloy such as TiNi line having excellent elasticity, a pure metal such as copper or aluminum, etc., a pure metal coated with carbon, a conductive material such as carbon, a carbon fiber, etc., and a conductive high molecule such as polypyrole.

A cathode electrode may be made of metal such as lithium, sodium, zinc, magnesium, cadmium, hydrogen storage alloy, lead, etc., a nonmetal such as carbon etc., and negative electrode material such as a high molecule material such as organic sulfur.

The anode electrode may be made of sulfur and metal sulfide, lithium transition metal oxide such as $LiCoO_2$, and positive electrode material such as $MnO_2$, $Ag_2O$, $Cl_2$, $NiCl_2$, $NiOOH$, and high molecule electrode etc. The electrolyte may be embodied in gel types using PEO, PVdF, PMMA, PVAC etc.

For the covered part, a high molecule resin may be used. For example, PVC, HDPE, epoxy resin, etc. may be used. Otherwise, any material as long as it prevents damage of a line shape battery, and also can be bent freely can be used as a covered part.

The anode electrode and cathode electrode in the power 180 may include a connector for being electrically connected with outside.

Referring to FIG. 31, the connector is formed in protruding form from the power 180, and in the display unit 110, a groove corresponding to the location, size and shape of the connector is formed. Accordingly, the power 180 may be combined with the display unit 100 by the combination of the connector and groove. The connector of the power 180 may be connected to the power connecting pad (not illustrated) inside the flexible display apparatus 100 and provide power.

Referring to FIG. 31, it is illustrated that the power 180 may be attached/detached at one edge of the flexible display apparatus 100, but this is merely an embodiment, and thus the location and shape of the power 180 may change depending on the product characteristics. For example, when the flexible display apparatus is a product having a certain thickness, the power 180 may be mounted on the back surface of the flexible display apparatus 100.

Figure 32A:
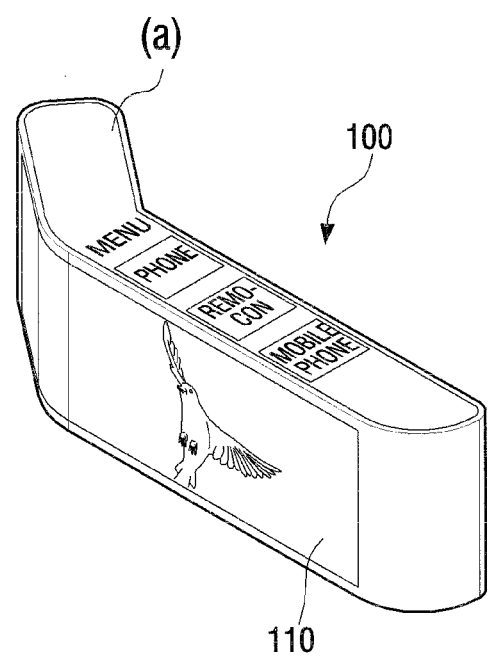
FIGS. 32A, 32B and 33 illustrate examples of a flexible display apparatus in accordance with various embodiments of the present disclosure.
Figure 32B:
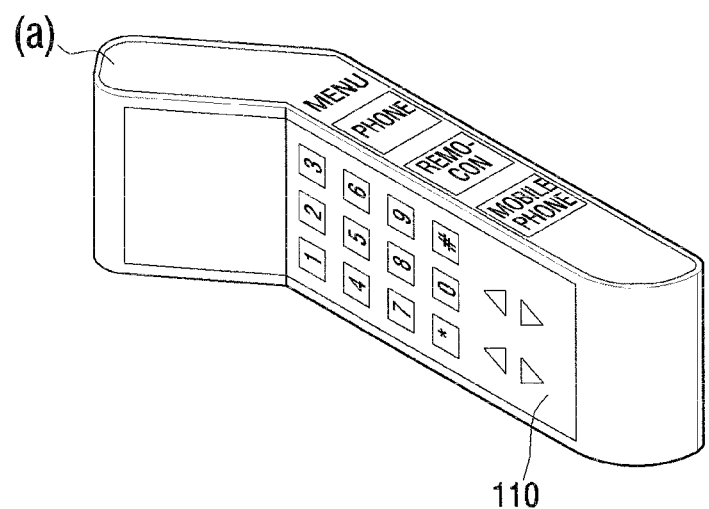

FIGS. 32A and 32B illustrate a case where a flexible display apparatus is embodied in a 3-dimensional display apparatus and not a flat display apparatus according to an embodiment of the present disclosure.

Referring to FIGS. 32A and 32B, a display unit 110 is provided at one side of the flexible display apparatus 100, and various hardware such as a button, a speaker, a microphone, an InfraRed (IR) lamp, etc. are provided on another surface.

The entire exterior case or a portion of the flexible display apparatus 100 may be made of rubber or other high molecule resin and thus may be bent as in FIGS. 32A and 32B. Accordingly, the entirety or a portion of the flexible display apparatus may have a flexible characteristic.

The flexible display apparatus 100 may perform new operations different from previous operations according to the bending input. For example, normally it may perform remote control functions for controlling the external device, and when a bending gesture is made in one area, it may perform call functions. When performing remote control functions, a remote control button may be displayed on the display unit 110, and when performing call functions, a dial pad may be displayed on the display unit 110.

Figure 33:
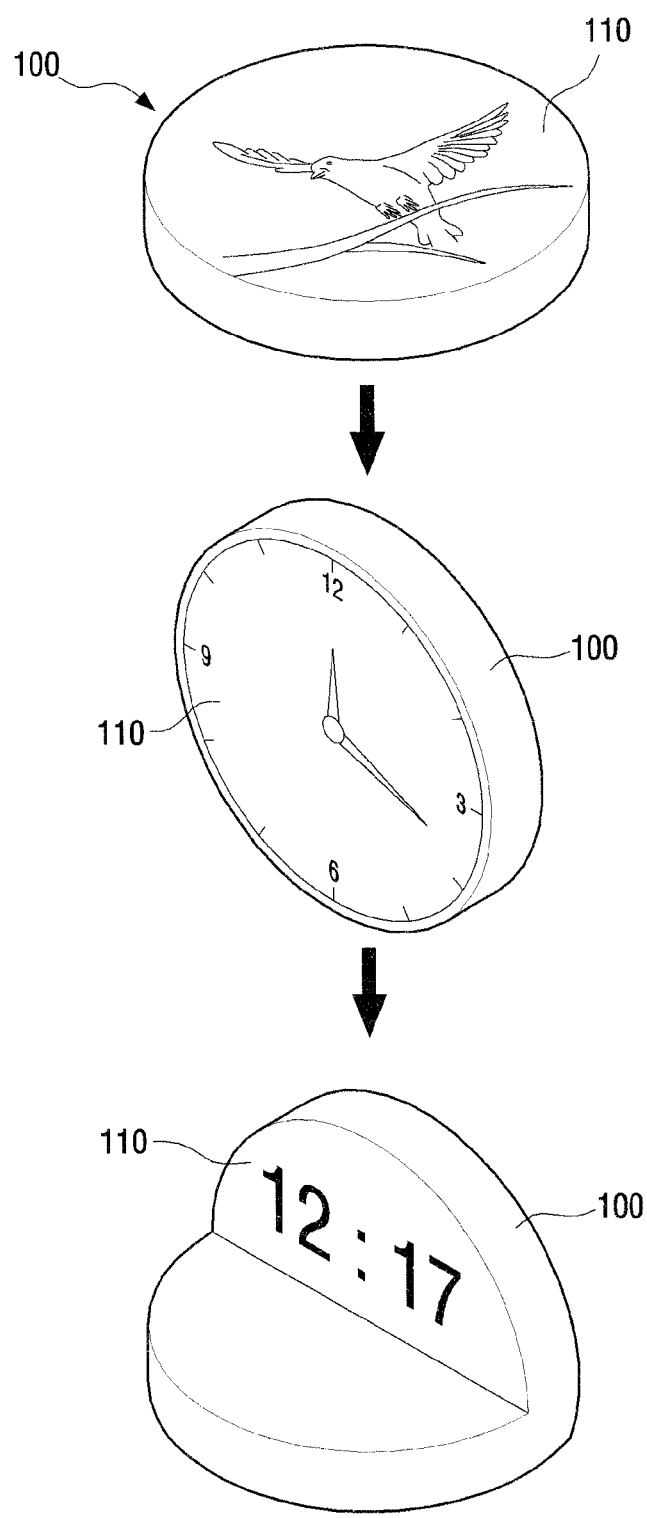

FIG. 33 illustrates a case where the flexible display apparatus is embodied in a circular shape according to an embodiment of the present disclosure.

Referring to FIG. 33, according to the format that the flexible display apparatus 100 is arranged or folded, visually and functionally different operations are performed. For example, the flexible display apparatus may display photographs or other contents when it is placed on the ground horizontally, and perform clock functions when it is erected vertically to the ground. Otherwise, when the central portion is bent by about 90 degrees, it may perform notebook PC functions. In this case, on one of the folded areas, a software keyboard may be displayed, and on another area, a display window may be displayed.

Besides the above, the flexible display apparatuses may be embodied in various formats.

The operation control methods of the flexible display apparatus according to the various aforementioned embodiments may be embodied in various formats.

The operation control methods of the flexible display apparatuses according to various embodiments may be embodied in programs and be provided to the flexible display apparatus.

More specifically, there may be provided a non-transitory computer readable medium which stores a program performing displaying the first contents on the first screen of the display unit, sensing the bending of the flexible display apparatus, and reconfiguring the first contents on the second screen generated on one area of the display unit based on the bending and displaying the same.

A non-transitory computer readable medium refers to a computer readable medium which stores data semi-permanently and not temporarily such as a register, cache, and memory etc. For example, the aforementioned various applications or programs may be stored in a non-transitory computer readable medium such as a CD, DVD, hard disk, Blu-ray disk, USB, memory card, and ROM etc.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A flexible display apparatus, comprising:
   a display;
   a sensor configured to sense bending of the display;
   a communicator configured to perform a video call with an external apparatus; and
   a processor configured to, in response to the display being divided into a first area and a second area according to bending of the display, display an image received from the external apparatus through the video call on the first area and display a user interface for selecting an object to be shared with the external apparatus on the second area.

2. The apparatus as claimed in claim 1, wherein the processor, in response to a touch input to the object displayed on the second area being received, controls the communicator to transmit the selected object to the external apparatus.

3. The apparatus as claimed in claim 2, wherein the processor, in response to a touch input of touching the object and dragging the object to the first area being received, controls the communicator to transmit the selected object to the external apparatus.

4. The apparatus as claimed in claim 2, wherein the processor displays on the first area the object transmitted to the external apparatus along with the image photographed by the external apparatus.

5. The apparatus as claimed in claim 1, wherein the processor, in response to the display being bent while the image photographed by the external apparatus is displayed on the display according to the video call, displays the image photographed by the external apparatus on the first area and displays the object on the second area.

6. The apparatus as claimed in claim 1, wherein the processor, in response to the object being received from the external apparatus while displaying the image photographed by the external apparatus according to the video call on the first area, displays the received object on the second area.

7. A controlling method of a flexible display apparatus comprising a display, comprising:
   performing a video call with an external apparatus;
   sensing bending of the display; and
   displaying, in response to the display being divided into a first area and a second area according to bending of the display, an image received from the external apparatus through the video call on the first area and displaying a user interface for selecting an object to be shared with the external apparatus on the second area.

8. The method as claimed in claim 7, further comprising:
transmitting, in response to a touch input to the object displayed on the second area being received, the selected object to the external apparatus.

9. The method as claimed in claim 8, wherein the transmitting, in response to a touch input of touching the object and dragging the object to the first area being received, transmits the selected object to the external apparatus.

10. The method as claimed in claim 8, further comprising:
displaying on the first area the object transmitted to the external apparatus along with the image photographed by the external apparatus.

11. The method as claimed in claim 7, wherein the displaying, in response to the display being bent while the image photographed by the external apparatus is displayed on the display according to the video call, displays the image photographed by the external apparatus on the first area and displays the object on the second area.

12. The method as claimed in claim 7, further comprising:
displaying, in response to the object being received from the external apparatus while displaying the image photographed by the external apparatus according to the video call on the first area, the received object on the second area.

* * * * *